United States Patent
Kuriyama et al.

(10) Patent No.: US 12,371,564 B2
(45) Date of Patent: Jul. 29, 2025

(54) RESIN COMPOSITION AND METHOD OF PRODUCING RESIN COMPOSITION, AND METHOD OF PRODUCING RESIN MOLDING

(71) Applicant: Sony Corporation, Tokyo (JP)

(72) Inventors: Akito Kuriyama, Kanagawa (JP); Yasuhito Inagaki, Kanagawa (JP); Kenji Ueda, Kanagawa (JP); Kohei Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 17/046,979

(22) PCT Filed: Jan. 28, 2019

(86) PCT No.: PCT/JP2019/002687
§ 371 (c)(1),
(2) Date: Oct. 12, 2020

(87) PCT Pub. No.: WO2019/198303
PCT Pub. Date: Oct. 17, 2019

(65) Prior Publication Data
US 2021/0130609 A1 May 6, 2021

(30) Foreign Application Priority Data
Apr. 12, 2018 (JP) .................................. 2018-076599

(51) Int. Cl.
*C08L 69/00* (2006.01)
*C08K 3/013* (2018.01)
*C08K 5/521* (2006.01)

(52) U.S. Cl.
CPC .............. *C08L 69/00* (2013.01); *C08K 3/013* (2018.01); *C08K 5/521* (2013.01)

(58) Field of Classification Search
CPC .......... C08L 69/00; C08K 3/013; C08K 5/521
See application file for complete search history.

(56) References Cited

U.S. PATENT DOCUMENTS

| | | | |
|---|---|---|---|
| 6,147,148 A * | 11/2000 | Tanaka | C08L 23/142 524/451 |
| 6,166,133 A * | 12/2000 | Catsman | C08L 55/02 525/92 E |
| 2007/0197740 A1* | 8/2007 | Hayata | C08L 69/00 525/465 |
| 2016/0024298 A1* | 1/2016 | Hayasaka | C08K 5/103 524/313 |

FOREIGN PATENT DOCUMENTS

| | | |
|---|---|---|
| CN | 102333821 A | 1/2012 |
| CN | 105315633 A | 2/2016 |
| CN | 107345042 A | 11/2017 |
| JP | H09-279129 A | 10/1997 |
| JP | H10-001562 A | 1/1998 |
| JP | H10-017703 A | 1/1998 |
| JP | 2001-187834 A | 7/2001 |
| JP | 2002-309101 A | 10/2002 |
| JP | 2004-018726 A | 1/2004 |
| JP | 2006-037032 A | 2/2006 |
| JP | 2006-119608 A | 5/2006 |
| JP | 2006-274187 A | 10/2006 |
| JP | 2006-313308 A | 11/2006 |
| JP | 2008-112065 A | 5/2008 |
| JP | 2010-144022 A | 7/2010 |
| JP | 2010150457 A | 7/2010 |
| JP | 2013-023609 A | 2/2013 |
| JP | 2013-199637 A | 10/2013 |
| JP | 2015-143322 A | 8/2015 |
| JP | 2016-023283 A | 2/2016 |
| JP | 2016-037561 A | 3/2016 |
| JP | 2016-188287 A | 11/2016 |
| JP | 2017082111 A | 5/2017 |
| JP | 2017-203154 A | 11/2017 |
| WO | 96/019532 A1 | 6/1996 |

OTHER PUBLICATIONS

International Search report mailed on Mar. 19, 2019 in International Application No. PCT/JP2019/002687.

* cited by examiner

*Primary Examiner* — John E Uselding
(74) *Attorney, Agent, or Firm* — K&L Gates LLP

(57) ABSTRACT

To provide a resin composition having excellent resin properties. Provided is a resin composition including: at least one thermoplastic resin (A); and a hydroxyl fatty acid ester (B) that are at least blended, in which when the weight-average molecular weight of the at least one thermoplastic resin (A) in terms of polystyrene is set to MW0 and the weight-average molecular weight of at least one thermoplastic resin (C) which has been produced after the blending in terms of polystyrene is set to MW1, the MW1 is decreased by 5% or more from the MW0.

6 Claims, No Drawings

RESIN COMPOSITION AND METHOD OF PRODUCING RESIN COMPOSITION, AND METHOD OF PRODUCING RESIN MOLDING

TECHNICAL FIELD

The present technology relates to a resin composition and a method of producing the resin composition, and a method of producing a resin molding.

BACKGROUND ART

Polycarbonate resins have been widely used for numerous products in the electrical and electronic and IT fields, for instance, because of excellent transparency, shock resistance, and heat resistance. As the products in these fields have recently been made thinner, a further improvement in the resin performance has been sought. Thus, R&D, which aims at a further improvement in the resin performance, has currently been conducted actively in these fields.

For instance, a polycarbonate resin composition including a polycarbonate resin, an organic acid, and an amide compound is disclosed (see Patent Document 1). In addition, a polycarbonate resin including an aromatic polycarbonate resin and a fatty acid compound, for instance, is also disclosed (see Patent Document 2).

CITATION LIST

Patent Document

Patent Document 1: Japanese Patent Application Laid-Open No. 2006-37032
Patent Document 2: Japanese Patent Application Laid-Open No. 2016-37561

SUMMARY OF THE INVENTION

Problems to be Solved by the Invention

Unfortunately, in the technologies disclosed in Patent Documents 1 and 2, there is a possibility that the resin performance, in particular, the resin properties are not necessarily improved further.

Here, the main purpose of the present technology is to provide a resin composition having excellent resin properties and a method of producing the resin composition, and a method of producing a resin molding using the resin composition.

Solutions to Problems

The present inventors have conducted intensive research to solve the above problems and, as a surprising result, have succeeded in dramatically enhancing the resin properties. Then, the present technology has been completed.

Specifically, the present technology provides a resin composition including: at least one thermoplastic resin (A); and a hydroxyl fatty acid ester (B) that are at least blended, in which when the weight-average molecular weight of the at least one thermoplastic resin (A) in terms of polystyrene is set to MW0 and the weight-average molecular weight of at least one thermoplastic resin (C) which has been produced after the blending in terms of polystyrene is set to MW1, the MW1 is decreased by 5% or more from the MW0.

In the resin composition according to the present technology, the content of the hydroxyl fatty acid ester (B) with respect to 100 parts by mass of the at least one thermoplastic resin (A) may be from 0.01 to 10 parts by mass.

In the resin composition according to the present technology, the at least one thermoplastic resin (A) at least optionally includes a polycarbonate resin (D).

In the resin composition according to the present technology, the polycarbonate resin (D) optionally includes a recovered polycarbonate resin.

In the resin composition according to the present technology, the polycarbonate resin (D) may be an aromatic polycarbonate resin and the content of the aromatic polycarbonate resin with respect to total mass of the polycarbonate resin (D) may be from 1 to 100 mass %.

In the resin composition according to the present technology, the polycarbonate resin (D) optionally includes a branch structure-containing aromatic polycarbonate resin.

In the resin composition according to the present technology, the polycarbonate resin (D) optionally includes an aromatic polycarbonate-polyorganosiloxane copolymer.

In the resin composition according to the present technology, the polycarbonate resin (D) optionally includes a polycarbonate resin having a weight-average molecular weight of from 30,000 to 70,000 in terms of polystyrene.

The at least one thermoplastic resin (C) at least optionally includes a polycarbonate resin (E).

The polycarbonate resin (E) optionally includes a polycarbonate resin having a weight-average molecular weight of from 20,000 to 65,000 in terms of polystyrene.

In the resin composition according to the present technology, the hydroxyl fatty acid ester (B) optionally includes a glycerin fatty acid ester.

In the resin composition according to the present technology, the hydroxyl fatty acid ester (B) optionally includes a polyglycerin fatty acid ester.

In the resin composition according to the present technology, the hydroxyl fatty acid ester (B) may have a hydroxyl value of 50 or higher.

In the resin composition according to the present technology, the hydroxyl fatty acid ester (B) may have an acid value of less than 5.

In the resin composition according to the present technology, the hydroxyl fatty acid ester (B) may have a saponification value of from 150 to 300.

The resin composition according to the present technology optionally includes a shock resistance improver and the content of the shock resistance improver with respect to 100 parts by mass of the at least one thermoplastic resin (A) may be from 0.1 to 10 parts by mass.

The resin composition according to the present technology optionally includes an inorganic filler and the content of the inorganic filler with respect to 100 parts by mass of the at least one thermoplastic resin (A) may be from 3 to 60.

The resin composition according to the present technology optionally includes a flame retardant and the content of the flame retardant with respect to 100 parts by mass of the at least one thermoplastic resin (A) may be from 0.01 to 200 parts by mass.

In the resin composition according to the present technology, the flame retardant optionally includes a phosphate-based compound, optionally includes a siloxane-based compound, optionally includes an organometallic salt compound, optionally includes an organic sulfonic acid metal salt compound, and further optionally includes an organic sulfonic acid polymer and/or a metal salt compound of the organic sulfonic acid polymer.

In the resin composition according to the present technology, the organic sulfonic acid polymer and/or the metal salt compound of the organic sulfonic acid polymer may have a weight-average molecular weight of 20,000 or higher in terms of polystyrene.

In the resin composition according to the present technology, the organic sulfonic acid polymer and/or the metal salt compound of the organic sulfonic acid polymer optionally includes 1 mol % to 100 mol % of an aromatic ring and the aromatic ring optionally has 0.01 to 10 mol % of a sulfonate group and/or a metal sulfonate group introduced therein.

In addition, the present technology provides a method of producing a resin composition, the method including: at least adding at least one thermoplastic resin (A) and a hydroxyl fatty acid ester (B); kneading the at least one thermoplastic resin (A) and the hydroxyl fatty acid ester (B); and performing the kneading to produce the at least one thermoplastic resin (C), in which when the weight-average molecular weight of the at least one thermoplastic resin (A) in terms of polystyrene is set to MW0 and the weight-average molecular weight of the at least one thermoplastic resin (C) in terms of polystyrene is set to MW1, the MW1 is decreased by 5% or more from the MW0.

In the method of producing a resin composition according to the present technology, 100 parts by mass of the at least one thermoplastic resin (A) and 0.01 to 10 parts by mass of the hydroxyl fatty acid ester (B) may be at least added.

In the method of producing a resin composition according to the present technology, the kneading may be performed at least once.

Further, the present technology provides a method of producing a resin molding, the method including: forming a resin composition into a resin pellet; and adding a hydroxyl fatty acid ester (B) to the resin pellet before the resin pellet is subjected to injection molding, in which the resin composition is prepared by blending at least one thermoplastic resin (A) and the hydroxyl fatty acid ester (B) and when the weight-average molecular weight of the at least one thermoplastic resin (A) in terms of polystyrene is set to MW0 and the weight-average molecular weight of at least one thermoplastic resin (C) which has been produced after the blending in terms of polystyrene is set to MW1, the MW1 is decreased by 5% or more from the MW0.

Effects of the Invention

The present technology makes it possible to further improve the resin properties. Note that the effects described herein are not necessarily limited and may be any effects illustrated in this disclosure.

MODE FOR CARRYING OUT THE INVENTION

Hereinafter, preferable embodiments for carrying out the present technology will be described. Embodiments described below represent a typical embodiment of the present technology. Accordingly, the scope of the present technology should not be construed narrowly by them.

Note that the following order is used for the description.
1. Overview of Present Technology
2. First Embodiment (Example of Resin Composition)
2-1. Resin Composition
2-2. Thermoplastic Resin (A)
2-3. Hydroxyl Fatty Acid Ester (B)
2-4. Thermoplastic Resin (C)
2-5. Shock Resistance Improver (F)
2-6. Inorganic Filler (G)
2-7. Flame Retardant (H)
2-8. Dripping Inhibitor (I)
2-9. Additional Components
3. Second Embodiment (Example of Method of producing Resin Composition)
3-1. Method of Producing Resin Composition
4. Third Embodiment (Example of Method of Producing Resin Molding)
4-1. Method of Producing Resin Molding
4-2. Resin Molding 1. Overview of Present Technology Overview of the present technology is first described.

The present technology relates to a resin composition and a method of producing the resin composition, and a method of producing a resin molding. Specifically, the present technology pertains to a resin composition prepared by blending at least one thermoplastic resin (A) and a hydroxyl fatty acid ester (B) to have remarkable flowability, a method of producing the resin composition, and a method of producing a resin molding using the resin composition.

In the electrical and electronic and IT fields, for instance, the market requirements are that the materials are provided with well-balanced flowability without impairing shock resistance and flame retardancy. The first instance is represented by a polycarbonate resin composition that has increased flowability and is prepared by blending an organic acid and an amide compound in a polycarbonate resin at the time of making the polycarbonate resin highly flowable. Next, the second instance is represented by a resin composition that can be used to produce a highly transparent molded product while keeping favorable flowability during molding after blending a particular amount of a fatty acid compound having specific physical properties as a flowability improver with an aromatic polycarbonate resin at the time of making the polycarbonate resin highly flowable. However, specific material characteristics and techniques for this second instance of resin composition has not been unveiled.

Meanwhile, in the electrical and electronic and IT fields, for instance, further increased flowability is necessary as products are increasingly made thinner and more lightweight. Accordingly, an improvement in the resin properties has been sought so as to impart further increased flowability. Furthermore, recovered polycarbonate resin wastes have a prescribed flowability and molecular weight depending on each usage. Here, it is difficult to adjust the flowability in the case of recycling for different usage.

The present inventors have conducted intensive research under such a situation and, as a result, have succeeded in markedly improving flowability of a resin composition after at least one thermoplastic resin (C) is produced while the molecular weight is made low by blending at least one thermoplastic resin (A) and a hydroxyl fatty acid ester (B), and have further succeeded in freely adjusting the molecular weight of the at least one thermoplastic resin (C) to freely adjust flowability of the resin composition. Then, the present technology has been completed.

Any resin composition according to the present technology has superior flowability and is thus suitably used for products that should be made lightweight and thinner and require good design in various fields such as electrical and electronic, IT, and OA devices, and is therefore highly industrially valuable. In addition, any resin composition according to the present technology has increased shock resistance, flame retardancy, and rigidity while possessing superior flowability. Further, in a case where a polycarbonate resin waste material is used in a resin composition according to the present technology, the flowability (molecular weight) of the polycarbonate resin waste material is freely adjustable, which can extend usage of the waste material developed for certain usage. This contributes to protection of the environment in view of saving a resource for the polycarbonate resin. Hence, the resin composition is highly industrially valuable.

2. First Embodiment (Example of Resin Composition)

[2-1. Resin Composition]

Hereinafter, a resin composition according to the first embodiment of the present technology will be described in detail.

Specifically, the resin composition according to the first embodiment according to the present technology is a resin composition including at least one thermoplastic resin (A) and a hydroxyl fatty acid ester (B) that are at least blended, in which when the weight-average molecular weight of the at least one thermoplastic resin (A) in terms of polystyrene is set to MW0 and the weight-average molecular weight of at least one thermoplastic resin (C) which has been produced after the blending in terms of polystyrene is set to MW1, the MW1 is decreased by 5% or more from the MW0. The resin composition according to the first embodiment of the present technology can be made highly flowable.

Of the resin composition according to the first embodiment of the present technology, the MW1 is decreased by 5% or more, preferably decreased by 10% or more, and more preferably decreased by 15% or more from the MW0 as described above. In the preferable embodiment or more preferable embodiment, the resin composition according to the first embodiment of the present technology can be suitably made highly flowable.

[2-2. Thermoplastic Resin (A)]

As described above, the resin composition according to the first embodiment of the present technology is prepared by at least blending at least one thermoplastic resin (A). In the resin composition according to the first embodiment of the present technology, the thermoplastic resin (A) may be one kind of thermoplastic resin (A) or may be two or more kinds of thermoplastic resin (A). If the thermoplastic resin (A) includes two or more kinds, the two or more kinds of thermoplastic resin (A) are mixed by a polymer blending technique to give a polymer alloy. Examples of the polymer alloy include a polymer alloy including polycarbonate and polystyrene and/or high-impact polystyrene, a polymer alloy including polycarbonate and ABS resin, a polymer alloy including polycarbonate and AS resin (an acrylonitrile-styrene copolymer), and a polymer alloy including polycarbonate and polyethylene terephthalate resin. The at least one thermoplastic resin may be an amorphous resin or a crystalline resin. Examples of the amorphous resin include polystyrene, ABS resin, acrylic resin, AS resin, or polycarbonate resin. Examples of the crystalline resin include polyethylene, polypropylene, polyethylene terephthalate, polybutylene terephthalate, or polyamide.

The at least one thermoplastic resin (A) preferably includes at least a polycarbonate resin (D). Note that the at least one thermoplastic resin (A) may include a polycarbonate resin (D).

(Polycarbonate Resin (D))

The molecular weight of the polycarbonate resin (D) may be any value and the weight-average molecular weight in terms of polystyrene is preferably from 30,000 to 70,000. Unless the molecular weight, namely the weight-average molecular weight of the polycarbonate resin (D) in terms of polystyrene is in a range from 30,000 to 70,000, the resulting resin molding may fall under a case where the molding is unsuitable in the aspects of strength and workability.

The polycarbonate resin (D) having a weight-average molecular weight (in terms of polystyrene) of from 30,000 to 70,000 (the resin may be, for instance, an aromatic polycarbonate resin and a mixture of polycarbonate resins having at least one different weight-average molecular weight, provided that the weight-average molecular weight of the mixture is the arithmetical mean of the respective weight-average molecular weights) can be used as a raw material for producing a molded part from a resin composition according to the first embodiment of the present technology and/or a resin composition with flame retardancy (e.g., a flame-retardant polycarbonate resin). The polycarbonate resin (D) can also be used for applications such as optical discs, home appliances, automobile casings and materials for their parts, building materials, and water bottles. It is usually possible to use an aromatic polycarbonate resin produced by reacting a dihydric phenol and a carbonate precursor. Examples of the reaction scheme include interfacial polymerization, melt transesterification, solid-state transesterification of a carbonate prepolymer, and ring-opening polymerization of a cyclic carbonate compound. The dihydric phenol and carbonate precursor are not particularly limited and any kinds thereof may be used.

The polycarbonate resin (D) preferably includes an aromatic polycarbonate resin and the content of the aromatic polycarbonate resin with respect to total mass of the polycarbonate resin (D) is preferably from 1 to 100 mass %. The aromatic polycarbonate resin may be a polyester carbonate obtained by copolymerizing an aromatic dicarboxylic acid such as terephthalic acid, isophthalic acid, naphthalenedicarboxylic acid, or a derivative thereof as long as the effects of the present technology are not impaired. Meanwhile, additional thermoplastic resins other than the polycarbonate resin (D) may be blended so as to improve the mechanical properties, chemical characteristics, or electrical properties unless the optical characteristics are impaired. The blending amount of the additional thermoplastic resin(s) varies depending on the kind and purposes and is usually preferably from 1 to 30 parts by mass and more preferably from 2 to 20 parts by mass with respect to 100 parts by mass of the polycarbonate resin (D) (e.g., an aromatic polycarbonate resin). Examples of the additional thermoplastic resin(s) include general-purpose plastics such as ABS resin, AS resin, polystyrene resin, high-impact polystyrene, polyethylene terephthalate resin, polyethylene resin, polypropylene resin, and polyalkylmethacrylate resin, engineering plastics such as polyphenylene ether resin, polyacetal resin, polyamide resin, cyclic polyolefin resin, and polyarylate resin (amorphous polyarylate, liquid crystalline polyarylate), and what is called super engineering plastics such as polyetheretherketone, polyetherimide, polysulfone, polyethersulfone, and polyphenylene sulfide. Further, it is possible to use a thermoplastic elastomer(s) such as an olefin-based thermoplastic elastomer, a polyamide-based thermoplastic elastomer, and/or a polyurethane-based thermoplastic elastomer.

<Branch Structure-Containing Polycarbonate Resin (D)>

The polycarbonate resin (D) optionally includes a branch structure-containing aromatic polycarbonate resin (sometimes referred to as a branched polycarbonate resin) or may include a branch structure-containing aromatic polycarbonate resin (sometimes referred to as a branched polycarbonate resin). The branch structure-containing aromatic polycarbonate resin may have any mol % of branch structure and preferably has a branch structure in an amount of from 0.01 to 10.0 mol %. If the amount of branch structure is less than 0.01 mol %, there is no big difference from that with a common linear structure. As a result, the drip-preventing effect during burning is possibly small. If the amount of branch structure is larger than 10 mol, the percentage of branch becomes large. This causes the drip-preventing effect to increase, but may cause the flowability to considerably decrease, which can be undesirable.

Any branched polycarbonate resin is acceptable as the branched polycarbonate (PC) resin, which is not particularly limited. Examples of the branched polycarbonate (PC) resin include a branched aromatic polycarbonate which has a branched backbone derived from a branching agent represented by the following general formula (I) and in which usage of the branching agent with respect to a dihydric phenol compound may range from 0.01 to 3 mol % or from 0.1 to 2.0 mol %.

[Chemical 1]

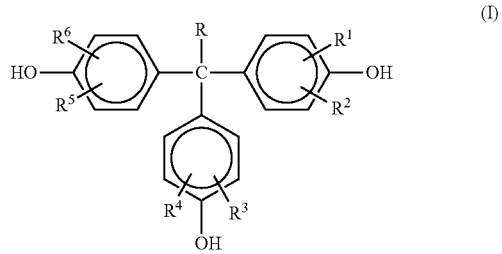

(I)

R is hydrogen or a $C_{1-5}$ alkyl group such as a methyl group, an ethyl group, an n-propyl group, an n-butyl group, or an n-pentyl group. In addition, R1 to R6 are each independently hydrogen, a $C_{1-5}$ alkyl group (e.g., a methyl group, an ethyl group, an n-propyl group, an n-butyl group, an n-pentyl group), or a halogen atom (e.g., a chlorine atom, a bromine atom, a fluorine atom).

Further, specific examples of the branching agent represented by the above general formula (I) include compounds having 3 or more functional groups such as 1,1,1-tris(4-hydroxyphenyl)-methane; 1,1,1-tris(4-hydroxyphenyl)-ethane; 1,1,1-tris(4-hydroxyphenyl)-propane; 1,1,1-tris(2-methyl-4-hydroxyphenyl)-methane; 1,1,1-tris(2-methyl-4-hydroxyphenyl)-ethane; 1,1,1-tris(3-methyl-4-hydroxyphenyl)-methane; 1,1,1-tris(3-methyl-4-hydroxyphenyl)-ethane; 1,1,1-tris(3,5-dimethyl-4-hydroxyphenyl)-methane; 1,1,1-tris(3,5-dimethyl-4-hydroxyphenyl)-ethane; 1,1,1-tris(3-chloro-4-hydroxyphenyl)-methane; 1,1,1-tris(3-chloro-4-hydroxyphenyl)ethane; 1,1,1-tris(3,5-dichloro-4-hydroxyphenyl)-methane; 1,1,1-tris(3,5-dichloro-4-hydroxy) Phenyl)-ethane; 1,1,1-tris(3-bromo-4-hydroxyphenyl)-methane; 1,1,1-tris(3-bromo-4-hydroxyphenyl)-ethane; 1,1,1-tris(3,5-dibromo-4-hydroxyphenyl)-methane; 1,1,1-tris(3,5-dibromo-4-hydroxyphenyl)-ethane, 4,4'-[1-[4-[1-(4-hydroxyphenyl)-1-methylethyl]phenyl]ethylidene]bisphenol; α,α',α"-tris(4-hydroxyphenyl)-1,3,5-triisopropylbenzene; 1-[α-methyl-α-(4'-hydroxyphenyl)ethyl]-4-[α',α'-bis(4"-hydroxyphenyl) ethyl]benzene; phloroglysin, trimellitic acid, or isatin bis(o-cresol). Among them, it is preferable to use 1,1,1-tris(4-hydroxyphenyl)ethane from the viewpoints of availability, reactivity, cost performance, and the like.

These branching agents may be used singly or two or more kinds thereof may be mixed and then used. In addition, in a case where 1,1,1-tris(4-hydroxyphenyl)ethane is used as the branching agent, the usage with respect to a dihydric phenol compound is preferably from 0.2 to 2.0 mol %, more preferably from 0.3 to 2.0 mol, and still more preferably from 0.4 to 1.9 mol %. If the usage is 0.2 mole or more, freedom of the blending extends. If the usage is 2.0 mole or less, gelation during polymerization is unlikely to occur. This makes it easy to produce polycarbonate.

The branched polycarbonate resin has a branched backbone derived from a branching agent represented by the above general formula (I), and is specifically represented by the following formula:

[Chemical 2]

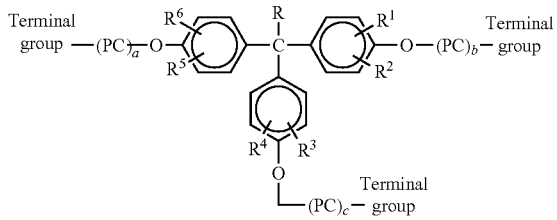

where a, b, and c are each an integer and PC denotes a polycarbonate moiety.

In a case where bisphenol A is used as a raw material component, for instance, PC denotes a repeating unit represented by the following formula:

[Chemical 3]

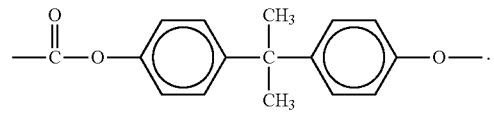

The amount (proportion) of the branched polycarbonate resin (e.g., a branched aromatic polycarbonate resin) with respect to 100 parts by mass of the polycarbonate resin (B) is preferably from 10 to 100 parts by mass and more preferably from 50 to 100 parts by mass. Unless the amount of the branched polycarbonate resin (e.g., a branched aromatic polycarbonate resin) is 10 parts by mass or more, the effects of giving the thinner product flame retardancy are not necessarily obtained.

<Aromatic Polycarbonate-Polyorganosiloxane Copolymer>

The polycarbonate resin (D) optionally includes an aromatic polycarbonate-polyorganosiloxane copolymer. Regarding the aromatic polycarbonate-polyorganosiloxane copolymer, if the proportion of the siloxane structure included in the aromatic polycarbonate-polyorganosiloxane copolymer is high, flame retardancy of the polycarbonate increases. As a result, the flame retardancy can be further increased while the flowability is kept.

The aromatic polycarbonate-polyorganosiloxane copolymer includes an aromatic polycarbonate moiety and a polyorganosiloxane moiety, and includes an aromatic polycarbonate structural unit represented by the following general formula (V) and a polyorganosiloxane structural unit represented by general formula (VI).

[Chemical 4]

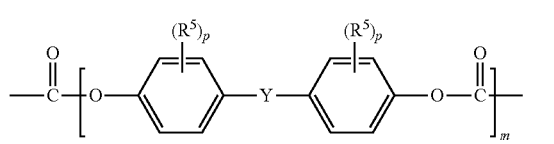

(V)

In the above formula (V), $R^5$ and $R^6$ each represents a halogen atom, a $C_{1-6}$ (preferably $C_{1-4}$) alkyl group, or an optionally substituted phenyl group; if there is a plurality of $R^5$ and $R^6$ portions, the portions may be the same or different; Y represents any of a single bond, a $C_{1-20}$ (preferably $C_{2-10}$) alkylene group or alkylidene group, a $C_{5-20}$ (preferably $C_{5-12}$) cycloalkylene group or cycloalkylidene group, —O—, —S—, —SO—, —SO$_2$—, or —CO—, and is preferably an isopropylidene group; p and q are each an integer of 0 to 4 (preferably 0), and if there is a plurality of p and q portions, the portions may be the same or different; and m represents an integer of 1 to 100 (preferably an integer of 5 to 90). If m is from 1 to 100, the aromatic polycarbonate-polyorganosiloxane copolymer can have a suitable viscosity average molecular weight.

[Chemical 5]

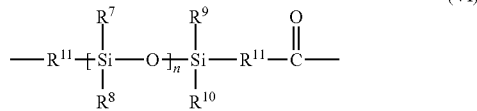

(VI)

In the above formula (VI), $R^7$ to $R^{10}$ each represents a $C_{1-6}$ alkyl group or an optionally substituted phenyl group and may be the same or different. Specific examples of $R^7$ to $R^{10}$ include an alkyl group such as a methyl, ethyl, propyl, n-butyl, isobutyl, amyl, isoamyl, or hexyl group, or a phenyl-based aryl such as a phenyl, tolyl, xylyl, or naphthyl group. $R^{11}$ represents an organic residue including an aliphatic or aromatic moiety, and preferably a divalent organic compound residue such as an o-allylphenol residue, a p-hydroxystyrene residue, or an eugenol residue.

Regarding the production method, the above aromatic polycarbonate-polyorganosiloxane copolymer can be produced by, for instance, dissolving, into a solvent such as methylene chloride, an aromatic polycarbonate oligomer and polyorganosiloxane having a reactive group at the terminal that constitutes the polyorganosiloxane moiety; and carrying out an interfacial polycondensation reaction using a catalyst such as triethylamine while adding a dihydric phenol such as bisphenol A.

The polymerization degree of the aromatic polycarbonate structural unit of the aromatic polycarbonate-polyorganosiloxane copolymer used is preferably from about 3 to 100 and the polymerization degree of the polyorganosiloxane structural unit thereof is preferably from about 2 to 500, more preferably from about 2 to 300, and still more preferably from about 2 to 140. In addition, the content of polyorganosiloxane in the aromatic polycarbonate-polyorganosiloxane copolymer is in a range usually from about 0.1 to 10 mass % and preferably from 0.3 to 6 mass %. The viscosity average molecular weight of the aromatic polycarbonate-polyorganosiloxane copolymer used to form a transparent resin composition according to the first embodiment of the present technology is usually from about 5,000 to 100,000, preferably from 10,000 to 30,000, and particularly preferably from 12,000 to 30,000. Here, the viscosity average molecular weight (Mv) may be calculated in a similar manner as above.

(Recovered Polycarbonate Resin)

The above-described polycarbonate resin (D) may be a newly produced virgin material or a waste material, end material, sprue material, or scrap generated during manufacturing steps, or a recovered or waste material from products (e.g., an optical disc (board) such as a digital versatile disc (DVD), a compact disc (CD), an MO, an MD, or a Blu-ray disc (BD)), optical lenses and sheets, home appliances and lighting, automobiles, building materials, casings and parts for water bottles, or case materials.

Thus, the polycarbonate resin (D) may contain the recovered polycarbonate resin in an amount of from 1 to less than 100 mass % or may include the recovered polycarbonate resin (100 mass %).

For instance, in a case where a recovered optical disc is used, there are various attached materials such as a metal reflective layer, a plating layer, a recording material layer, an adhesive layer, and a label. In the invention, the optical disc may be used while they are attached, or such impurities or by-materials may be separated and removed using a conventionally known procedure and then used.

Specific examples include an Al, Au, Ag, or Si metal reflective layer, an organic dye containing a cyanine dye, a Te, Se, S, Ge, In, Sb, Fe, Tb, Co, Ag, Ce, or Bi recording material layer, an adhesive layer containing at least one kind of acrylic acrylate, ether-based acrylate, a vinyl-based monomer, oligomer, or polymer, or a label ink layer obtained by mixing at least one kind of UV-curable monomer, oligomer, or polymer and a polymerization initiator, a pigment and an auxiliary agent. They are not limited. Also, it is possible to include a film-forming material or a coating material usually used in optical discs. Note that from the viewpoint of recycling, the raw material should be low-cost. It is thus suitable to recycle the resin while including impurities derived from the various materials. For instance, optical discs are finely crushed, and then kneaded and melted as they are or with given additives to prepare a pellet, which may then be used as a PC resin raw material (component A). Alternatively, depending on the structure of an injection molding machine, the recovered discs, together with the various additive agents as described later, may be directly put into, for instance, a hopper of the injection molding machine to produce a resin composition-made molding. Note that in a case where the polycarbonate resin (D) free of the above various impurities is used, attached materials such as a metal reflective layer, a recording material layer, an adhesive layer, a surface cured layer, and a label may be removed by a mechanical or chemical procedure disclosed in, for instance, JPH06-223416A, JPH10-269634A, or JPH10-249315A.

From the viewpoint of recycling in as low cost as possible, it is suitable to recycle while impurities are included in the resin. For instance, it is desirable that the recovered aromatic polycarbonate resin is finely crushed and is then kneaded and melted as it is or with given additives to prepare a pellet, which may be used as a raw material for the aromatic polycarbonate resin. Alternatively, depending on the structure of an injection molding machine, the recovered aromatic polycarbonate resin, together with an additional resin component(s) and various additive agents, may be directly put into, for instance, a hopper of the injection molding machine to produce a molding produced using the aromatic polycarbonate resin composition.

Meanwhile, the weight-average molecular weight of the polycarbonate resin (D) or (E) may be measured in terms of polystyrene by gel permeation chromatography (GPC) measurement using a chloroform solvent while a polystyrene molecular weight standard (sample) is used as a reference.

[2-3. Hydroxyl Fatty Acid Ester (B)]

As described above, the resin composition according to the first embodiment of the present technology is prepared by at least blending a hydroxyl fatty acid ester (B). Note that the hydroxyl fatty acid ester includes one or more hydroxyl groups (—OH groups) and is defined as a substance having a structure in which a fatty acid is linked by an ester bond.

The hydroxyl fatty acid ester (B) is an esterified compound obtained by esterification of a glycerin compound and a fatty acid or an esterified compound obtained by esterification of a fatty acid and a polyglycerin produced by polymerizing a glycerin compound.

Examples of the glycerin compound include glycerin such as glycerin, diglycerin, triglycerin, tetraglycerin, pentaglycerin, hexaglycerin, heptaglycerin, octaglycerin, nonaglycerin, or decaglycerin. Preferred is diglycerin or triglycerin. The glycerin compounds may be used singly or two or more kinds thereof may be used in combination.

Examples of the fatty acid include a $C_{1-100}$ fatty acid such as lauric acid, myristic acid, palmitic acid, palmitoleic acid, stearic acid, oleic acid, linoleic acid, linolenic acid, nonadecanoic acid, arachidic acid, gadleyic acid, eicosadienic acid, arachidonic acid, behenic acid, erucic acid, docosadienoic acid, lignoceric acid, isostearic acid, ricinoleic acid, 12-hydroxystearic acid, 9-hydroxystearic acid, 10-hydroxystearic acid, or hydrogenated castor oil fatty acid (fatty acid containing a small amount of stearic acid and palmitic acid in addition to 12-hydroxystearic acid). Preferred is palmitic acid, stearic acid, or oleic acid. The fatty acids may be used singly or two or more kinds thereof may be used in combination.

Any production method is acceptable as a method of producing a glycerin fatty acid ester and is not particularly limited. For instance, the glycerin fatty acid ester may be obtained by heating the above glycerin compound and fatty acid in the absence or presence of a catalyst such as phosphoric acid, p-toluenesulfonic acid, or caustic soda in a range of from 100° C. to 300° C. and preferably from 120° C. to 260° C.; and by removing generated water outside the system. The reaction is preferably carried out in the presence of inert gas. In addition, the reaction may be carried out in an azeotropic solvent such as toluene or xylene. Specific examples of the glycerin fatty acid ester as so obtained include diglycerin palmitate, diglycerin stearate, diglycerin oleate, decaglycerin palmitate, decaglycerin stearate, or decaglycerine oleate. Among them, a polyglycerin fatty acid ester such as diglycerin stearate or decaglycerin stearate is preferable.

Any synthetic one or any commercially available product may be used as the glycerin fatty acid ester. Examples of the commercially available product include "CHIRABAZOL D-818M" or "CHIRABAZOL H-818" (a polyglycerin fatty acid ester), manufactured by Taiyo Kagaku Co., Ltd. Meanwhile, the glycerin fatty acid esters may be used singly or two or more kinds thereof may be used in combination.

The molecular weight of the hydroxyl fatty acid ester (B), for instance, a glycerin fatty acid ester is not particularly limited. The hydroxyl value of the hydroxyl fatty acid ester (B), for instance, a glycerin fatty acid ester may be any value and preferably 50 or higher and more preferably 70 or higher. If the hydroxyl value of the hydroxyl fatty acid ester (B), for instance, a glycerin fatty acid ester is less than 50, a rate of decrease in the molecular weight may be small and the effect of improving flowability may be lowered.

The acid value of the hydroxyl fatty acid ester (B), for instance, a glycerin fatty acid ester may be any value and is in a range of preferably less than 5 and more preferably less than 3. If the acid value of the hydroxyl fatty acid ester (B), for instance, a glycerin fatty acid ester is 5 or greater, a rate of decrease in the molecular weight may be small and the effect of improving flowability may be lowered.

The saponification value of the hydroxyl fatty acid ester (B), for instance, a glycerin fatty acid ester may be any value and preferably from 150 to 300 and more preferably from 165 to 200. If the saponification value of the hydroxyl fatty acid ester (B), for instance, a glycerin fatty acid ester is less than 150, the effect of improving flowability may be lowered. if the saponification value exceeds 300, a decrease in the molecular weight of the polycarbonate may be uncontrollable.

The content of the hydroxyl fatty acid ester (B), for instance, a glycerin fatty acid ester compound with respect to 100 parts by mass of the at least one thermoplastic resin (A) preferably ranges from 0.01 to 10 parts by mass and more preferably ranges from 0.1 parts by mass to 5 parts by mass. If the content of the hydroxyl fatty acid ester (B), for instance, a glycerin fatty acid ester with respect to 100 parts by mass of the at least one thermoplastic resin (A) is less than 0.01 parts by mass, the effect on the resin, namely the effect of decreasing the molecular weight of the thermoplastic resin may be small. In the case of more than 10 parts by mass, a decrease in the molecular weight of the at least one thermoplastic resin (A) may be uncontrollable. Thus, the strength (e.g., shock resistance) of a molding produced may be lowered.

[2-4. Thermoplastic Resin (C)]

At least one thermoplastic resin (C) is generated while the at least one thermoplastic resin (A) and the hydroxyl fatty acid ester (B) are at least blended and the molecular weight thereof is lowered after the blending. Once the at least one thermoplastic resin (C) is generated after the molecular weight is lowered, a decrease in the molecular weight while the reaction proceeds further does not occur. Accordingly, the at least one thermoplastic resin (C) is stably included in the resin composition according to the first embodiment of the present technology.

In a case where the thermoplastic resin (A) is, for instance, the polycarbonate resin (D), the polycarbonate resin (D) and the hydroxyl fatty acid ester (B) are subjected to a transesterification reaction to generate a polycarbonate resin (E), the molecular weight of which is lowered. By changing the kind and additive amount of the hydroxyl fatty acid ester (B) with respect to the polycarbonate resin (D), the molecular weight of the polycarbonate resin (E) can be freely adjusted to freely adjust the flowability of the resin composition according to the first embodiment of the present technology.

The molecular weight of the polycarbonate resin (E) may be any value and the weight-average molecular weight in terms of polystyrene is preferably from 20,000 to 65,000. Unless the molecular weight, namely the weight-average molecular weight of the polycarbonate resin (E) in terms of polystyrene is in a range from 20,000 to 65,000, the resulting resin molding may fall under a case where the molding is unsuitable in the aspects of strength and workability.

[2-5. Shock Resistance Improver (F)]

The resin composition according to the first embodiment of the present technology optionally includes a shock resistance improver. The resin composition according to the first embodiment of the present technology may include a shock resistance improver to further increase the anti-impact strength.

The content of the shock resistance improver may be any amount and is preferably from 0.1 to 10 parts by mass with respect to 100 parts by mass of the at least one thermoplastic resin (A). If the content of the shock resistance improver is less than 0.1 parts by mass with respect to 100 parts by mass of the at least one thermoplastic resin (A), a sufficient effect of modifying the impact strength is not necessarily obtained. Thus, there is a possibility that the resulting molding member is fractured. By contrast, if the content of the shock resistance improver exceeds 10 parts by mass with respect to 100 parts by mass of the at least one thermoplastic resin (A), burning may occur during molding. There is also a risk of impairing the transparency and flame retardancy. Further, the content of the shock resistance improver is more preferably from 0.3 parts by mass to less than 8 parts by mass and still more preferably from 0.5 parts by mass to less than 5 parts by mass with respect to 100 parts by mass of the at least one thermoplastic resin (A).

As the shock resistance improver, it is possible to use a commonly known material that can be used to increase the anti-impact resistance and, for instance, has rubber elasticity. As the shock resistance improver, elastomers are preferably used and thermoplastic elastomers are preferably used among them. As the thermoplastic elastomers, various copolymerized resins are used, and the glass transition temperature is usually 0° C. or lower and preferably −10° C. or lower, more preferably −20° C. or lower, and still more preferably −30° C. or lower among them.

More specific examples used include an acryl-silicone copolymer, an SB (styrene-butadiene) copolymer, an SBS (styrene-butadiene-styrene block) copolymer, an ABS (acrylonitrile-butadiene-styrene) copolymer, an SEBS (styrene-ethylene-butylene-styrene) copolymer, an MBS (methyl methacrylate-butadiene-styrene) copolymer, an MABS (methyl methacrylate-acrylonitrile-butadiene-styrene) copolymer, an MB (methyl methacrylate-butadiene) copolymer, an ASA (acrylonitrile-styrene-acrylic rubber) copolymer, an AES (acrylonitrile-ethylene propylene rubber-styrene) copolymer, an MA (methyl methacrylate-acrylic rubber) copolymer, an MAS (methyl methacrylate-acrylic rubber-styrene) copolymer, a methyl methacrylate-acryl-butadiene rubber copolymer, a methyl methacrylate-acryl-butadiene rubber-styrene copolymer, a methyl methacrylate-(acryl-silicone IPN rubber) copolymer, or a natural rubber.

Preferable examples of the shock resistance improver can include an acryl-silicone block copolymer having a core/shell structure. This structure has a core/shell structure including a silicone/acrylic composite rubber component as a core portion and an acrylic component as a shell portion, and can elicit high impact performance. Specific examples of the product include METABLEN, S-2001, S-2006, S-2030, S-2100, or SX-005, which have been marketed by Mitsubishi Chemical Corporation. Specific examples of the butadiene-containing copolymerized material include an SBS (styrene-butadiene-styrene block) copolymer, an ABS (acrylonitrile-butadiene-styrene) copolymer, an SEBS (styrene-ethylene-butylene-styrene) copolymer, an MABS (methyl methacrylate-acrylonitrile-butadiene-styrene) copolymer, an MB (methyl methacrylate-butadiene) copolymer, or a methyl methacrylate-acryl-butadiene rubber copolymer. In this case, a combination with the at least one thermoplastic resin (A), for instance, the polycarbonate resin (D) can produce a remarkable effect of modifying the impact strength.

The resin composition according to the first embodiment of the present technology may be produced by mixing the at least one thermoplastic resin (A), for instance, the polycarbonate resin (D) and the shock resistance improver. Specifically, for instance, the pelleted at least one thermoplastic resin (A), such as the polycarbonate resin (D), (optionally including the hydroxyl fatty acid ester (B) and the at least one thermoplastic resin (C)) and the shock resistance improver may be mixed using an extruder and extruded into a strand shape. The resulting material may be cut into pellets to prepare a resin composition according to the first embodiment of the present technology.

[2-6. Inorganic Filler (G)]

The resin composition according to the first embodiment of the present technology preferably includes an inorganic filler. The resin composition according to the first embodiment of the present technology may include an inorganic filler to further increase the rigidity.

The content of the inorganic filler may be any amount and is preferably from 3 to 60 parts by mass with respect to 100 parts by mass of the at least one thermoplastic resin (A). If the content of the inorganic filler is less than 3 parts by mass with respect to 100 parts by mass of the at least one thermoplastic resin (A), a sufficient effect of modifying the rigidity strength is not necessarily obtained. By contrast, if the content of the inorganic filler exceeds 60 parts by mass with respect to 100 parts by mass of the at least one thermoplastic resin (A), the shock resistance and the molding performance may be impaired. Also, burrs are likely to occur frequently during molding.

Examples of the inorganic filler include: a fibrous inorganic filler such as glass fiber, carbon fiber, metal fiber, ceramic fiber, or milled fiber thereof, as well as slag fiber, rock wool, wollastonite, zonotolite, potassium titanate whiskers, aluminum borate whiskers, boron whiskers, or basic magnesium sulfate whiskers; a silicate compound such as glass flakes, glass beads, graphite, talc, mica, kaolinite, sepiolite, attabulgite, montmorillonite, bentonite, or smectite; or an inorganic filler such as silica, alumina, or calcium carbonate. These inorganic fillers may be, for instance, a metal-coated glass fiber or a metal-coated carbon fiber, the surface of which may be coated with a different kind of material. These inorganic fillers may be used singly or two or more kinds thereof may be used in combination.

[2-7. Flame Retardant (H)]

The resin composition according to the first embodiment of the present technology preferably includes a flame retardant. The resin composition according to the first embodiment of the present technology may include a flame retardant to further increase the flame retardancy.

The content of the flame retardant may be any amount and is preferably from 0.01 to 200 parts by mass with respect to 100 parts by mass of the at least one thermoplastic resin (A). The content preferably ranges from 0.05 parts by mass to 20 parts by mass and further preferably ranges from 0.1 parts by mass to 10 parts by mass. If the content of the flame retardant is less than 0.01 parts by mass with respect to 100 parts by mass of the at least one thermoplastic resin (A), a satisfactory flame retardant effect is not necessarily obtained. By contrast, if the content of the flame retardant exceeds 200 parts by mass with respect to 100 parts by mass of the at least one thermoplastic resin (A), the intrinsic characteristics (resin properties) of the thermoplastic resin may be impaired and the thermoplastic resin may also be cost-ineffective.

Examples of the flame retardant include an organic phosphate-based flame retardant, a halogenated phosphate-based flame retardant, an inorganic phosphorus flame retardant, a halogenated bisphenol-based flame retardant, a halogen compound-based flame retardant, an antimony-based flame retardant, a nitrogen-based flame retardant, a boron-based flame retardant, an inorganic flame retardant, a silicon-based flame retardant (including a siloxane-based compound), or an organic metal salt-based flame retardant. Any one or more kinds of them may be mixed and used.

Specific examples of the organic phosphate-based flame retardant include triphenyl phosphate, methyl neobenzyl phosphate, pentaerythritol diethyl diphosphate, methyl neopentyl phosphate, phenyl neopentyl phosphate, pentaerythritol diphenyl diphosphate, dicyclopentyl hypophosphite, dineopentyl hypophosphite, phenylpyrocatechol phosphite, ethylpyrocatechol phosphate, or dipyrocatechol hyposiphosphate. Any one or more kinds of them may be mixed and used.

Examples of the halogenated phosphate-based flame retardant include tris($\beta$-chloroethyl)phosphate, tris(dichloropropyl)phosphate, tris($\beta$-bromoethyl)phosphate, tris(dibromopropyl)phosphate, tris(chloropropyl)phosphate, tris(dibromophenyl)phosphate, tris(tribromophenyl)phosphate, tris(tribromoneopentyl) phosphate, condensed polyphosphate, or condensed polyphosphonate. Any one or more kinds of them may be mixed and used.

Examples of the inorganic phosphorous flame retardant include red phosphorus or an inorganic phosphate. One or both of them may be mixed and used.

Examples of the halogenated bisphenol-based flame retardant include tetrabromobisphenol A and its oligomers, or bis(bromoethyl ether)tetrabromobisphenol A. Any one or more kinds of them may be mixed and used.

Examples of the halogen compound-based flame retardant include decabromodiphenyl ether, hexabromobenzene, hexabromocyclododecane, tetrabromophthalic anhydride, a (tetrabrobismophenol) epoxy oligomer, hexabromobiphenyl ether, tribromophenol, dibromocresyl glycidyl ether, decabromodiphenyl oxide, halogenated polycarbonate, a halogenated polycarbonate copolymer, halogenated polystyrene, halogenated polyolefin, chlorinated paraffin, or perchlorocyclodecane. Any one or more kinds of them may be mixed and used.

Examples of the antimony-based flame retardant include antimony trioxide, antimony tetraoxide, antimony pentaoxide, or sodium antimonate. Any one or more kinds of them may be mixed and used.

Examples of the nitrogen-based flame retardant include melamine, alkyl group- or aromatic group-substituted melamine, melamine cyanurate, isocyanurate, melamine phosphate, triazine, a guanidine compound, urea, various cyanuric acid derivatives, or a phosphazene compound. Any one or more kinds of them may be mixed and used.

Examples of the boron-based flame retardant include zinc borate, zinc metaborate, or barium metaborate. Any one or more kinds of them may be mixed and used.

Examples of the inorganic flame retardant include: a hydrate of inorganic metal compound such as magnesium hydroxide, aluminum hydroxide, barium hydroxide, calcium hydroxide, dolomite, hydrotalcite, basic magnesium carbonate, zirconium hydride, or tin oxide hydrate; a metal oxide such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide, or tungsten oxide; metal powder of aluminum, iron, copper, nickel, titanium, manganese, tin, zinc, molybdenum, cobalt, bismuth, chromium, tungsten, antimony, etc.; or a carbonate such as zinc carbonate, magnesium carbonate, calcium carbonate, or barium carbonate. Any one or more kinds of them may be mixed and used.

Then, among the inorganic flame retardants, it is preferable from the viewpoints of flame retardancy and cost performance to use, for instance, magnesium hydroxide, aluminum hydroxide, talc, which is a hydrous magnesium silicate, basic magnesium carbonate, mica, hydrosalcite, or aluminum. Note that used recovered material and/or end material wasted in factories may be used as the inorganic flame retardant.

Examples of the silicon-based flame retardant include a polyorganosiloxane resin (e.g., silicone, organic silicate) or silica. Any one or more kinds of them may be mixed and used. Then, examples of the polyorganosiloxane resin include polymethylethylsiloxane resin, polydimethylsiloxane resin, polymethylphenylsiloxane resin, polydiphenylsiloxane resin, polydiethylsiloxane resin, polyethylphenylsiloxane resin, or a mixture thereof.

It is possible to include, in an alkyl group moiety of the polyorganosiloxane resin, a functional group such as an alkyl group, an alkoxy group, a hydroxyl group, an amino group, a carboxyl group, a silanol group, a mercapto group, an epoxy group, a vinyl group, an aryloxy group, a polyoxyalkylene group, a hydrogen group, or a halogen. It is preferable to include, in particular, an alkyl group, an alkoxy group, a hydroxyl group, a vinyl group, or the like.

Then, the polyorganosiloxane resin has an average molecular weight of 100 or higher and preferably in a range from 5500 to 5000000, and the form may be like any of oil, varnish, gum, powder, or pellet. Here, silica, the surface of which is treated with a silane coupling agent of hydrocarbon-based compound, is suitable.

Examples of the organic metal salt-based flame retardant include: an alkali metal salt or alkaline earth metal salt such as perfluoroalkane sulfonate, alkylbenzene sulfonate, halogenated alkylbenzene sulfonate, alkyl sulfonate, or naphthalene sulfonate; or an organic sulfonic acid polymer and/or a metal salt compound thereof. Any one or more kinds of them may be mixed and used.

Examples of the organic metal salt-based flame retardant containing a fluoroalkyl group include a perfluoroalkylsulphonate alkali (alkaline earth) metal salt, a perfluoroalkylcarbonate alkali (alkaline earth) metal salt, a perfluoroalkylphenylsulphonate alkali (alkaline earth) metal salt, or a perfluoroalkylphenylcarbonate alkali (alkaline earth) metal salt. A perfluoroalkylsulphonate alkali (alkaline earth) metal salt is most preferable among them. Examples of the perfluoroalkylsulphonate alkali (alkaline earth) metal salt include perfluoromethanesulfonate, perfluoroethanesulfonate, perfluoropropanesulfonate, perfluorobutanesulfonate, perfluoromethylbutanesulfonate, perfluorohexanesulfonate, perfluoroheptanesulfonate, or perfluorooctanesulfonate. Those containing 1 to 8 carbon atoms are particularly preferable. One or two or more kinds of them may be combined and used. Specific examples of them include potassium perfluorobutane sulfonate, potassium perfluorohexane sulfonate, potassium perfluorooctane sulfonate, sodium perfluorobutane sulfonate, sodium perfluorooctane sulfonate, lithium perfluorobutane sulfonate, lithium perfluoroheptane sulfonate, cesium perfluorobutane sulfonate, cesium perfluorooctane sulfonate, cesium perfluorohexane sulfonate, rubidium perfluorobutane sulfonate, or rubidium perfluorohexane sulfonate. Among them, sodium perfluorobutane sulfonate, potassium perfluorobutane sulfonate, or cesium perfluorobutane sulfonate is more preferable.

As the alkali (alkaline earth) metal in the perfluoroalkylsulphonate alkali (alkaline earth) metal salt, rubidium or cesium is suitable if the requirements for flame retardancy are higher. Meanwhile, they are not used commonly or difficult to purify, and as a result of which they have a disadvantage in view of cost. By contrast, lithium or sodium, which has an advantage in view of cost, may have, in turn, a disadvantage in view of flame retardancy. After these points are taken into account, the alkali (alkaline earth) metal in the perfluoroalkylsulphonate alkali (alkaline earth) metal salt can be used selectively. Here, potassium is best suited because of a good characteristic balance in view of all the points. In view of the above points, potassium perfluorobutane sulfonate is preferable.

The organic sulfonic acid polymer and/or a metal salt compound thereof do not affect the resin properties, and high flame retardancy can be imparted. The weight-average molecular weight of the organic sulfonic acid polymer and/or a metal salt compound of the organic sulfonic acid polymer may be any molecular weight. However, the weight-average molecular weight in terms of polystyrene is preferably 20,000 or higher. In addition, the metal salt compound of the organic sulfonic acid polymer preferably includes an aromatic ring in an amount of from 1 mol % to 100 mol. It is further preferable to introduce, into the aromatic ring, 0.01 to 10 mole of a sulfonate group and/or a metal sulfonate group.

Examples of the organic sulfonic acid or a salt thereof include various ones having a low molecular weight to a high molecular weight. Those with a high molecular weight generally have better dispersibility in the case of kneading into a polycarbonate (PC) resin and superior preservation stability (e.g., bleed-out prevention) under high-temperature high-humidity conditions, and are thus suitable.

More preferable examples include a core/shell-type styrene-based polymer in which a sulfonate group is bonded to a particle surface layer portion and an alkali metal salt or an alkaline earth metal salt thereof. Specific examples include polystyrene sulfonate and/or a potassium salt thereof. One or more compounds selected from them may be mixed and used in an appropriate ratio. Here, use of polystyrene sulfonate and/or a potassium salt thereof allows for a high flame retardancy effect even if the additive amount is very small. This is thus preferable. Further, if the weight-average molecular weight (in terms of polystyrene) is from 20,000 to 300,000, it is more preferable from the viewpoints of hygroscopic characteristic and compatibility with the thermoplastic resin.

The content of the above-described organic metal salt-based flame retardant is preferably from 0.001 to 3.0 parts by mass with respect to 100 parts by mass of the at least one thermoplastic resin (A). In the case of less than 0.001 parts by mass, the flame retardancy effect is not necessarily obtained. In addition, in the case of more than 3.0 parts by mass, the decomposition rate of the at least one thermoplastic resin (A), for instance, the polycarbonate resin (D) is sometimes accelerated excessively. This may cause a decrease in the level of flame retardancy.

[2-8. Dripping Inhibitor (I)]

In addition to the above-described flame retardant, a fluoroolefin resin, for instance, may be added so as to suppress a dripping phenomenon during burning.

Examples of the fluoroolefin resin that can suppress the dripping phenomenon include a difluoroethylene polymer, a tetrafluoroethylene polymer, a tetrafluoroethylene-hexafluoropropylene copolymer, or a copolymer of tetrafluoroethylene-ethylene-based monomers. Any one or more kinds of them may be mixed and used.

Among these fluoroolefin resins, a tetrafluoroethylene polymer, for instance, is particularly preferably used. The average molecular weight is 50,000 or higher and preferably in a range from 100,000 to 20,000,000. Note that as the fluoroolefin resin, those having a fibril formation potential are more preferable.

The content of the fluoroolefin resin with respect to the total mass of the resin composition may be any amount and preferably ranges from 0.001 mass % to 5 mass %, more preferably ranges from 0.005 mass % to 2 mass %, and still more preferably ranges from 0.01 mass % to 0.5 mass %.

If the content of the fluoroolefin resin with respect to the total mass of the resin composition is less than 0.001 mass %, it is sometimes difficult to suppress the dripping phenomenon. By contrast, if the content of the fluoroolefin resin is more than 5 mass %, the effect of potentially suppressing the dripping phenomenon is leveled. There is also a possibility of making the cost high and inducing defects including a decrease in the mechanical strength.

Any synthetic one or any commercially available product may be used as the dripping inhibitor. Examples of the commercially available product include "PTFE CD145", which is polytetrafluoroethylene (PTFE) and is manufactured by AGC Inc., and "FA500H", manufactured by DAIKIN INDUSTRIES, LTD. The dripping inhibitors may be used singly or two or more kinds thereof may be used in combination.

[2-9. Additional Components]

Meanwhile, the resin composition according to the first embodiment of the present technology optionally includes, in addition to the above, an additional additive agent(s) (component(s)) such as an antioxidant (a hindered phenol-based, phosphorus-based, or sulfur-based one), an antistatic agent, a UV absorber (a benzophenone-based, benzotriazole-based, hydroxyphenyltriazine-based, cyclic iminoester-based, or cyanoacrylate-based one), a light stabilizing agent, a plasticizer, a compatibilizer, a colorant (a pigment, a dye), a light diffuser, a light stabilizer, a crystal nucleating agent, an antimicrobial, a flow modifier, an infrared absorber, a phosphor, a hydrolysis inhibitor, a mold release agent, a silicone-based flame retardant, and/or a surface treatment agent. This can improve, for instance, injection molding performance, shock resistance, appearance, heat resistance, weather resistance, color, and/or rigidity. The above components may be used singly or two or more kinds thereof may be used in combination.

The resin composition according to the first embodiment of the present technology can be blended with an additive(s) in a small proportion so as to impart various functions to the resulting molded product and/or improve the characteristics. The additive(s) can be blended in a typical blending amount as long as neither the transparency, flame retardancy, nor durability is impaired. Examples of such an additive agent(s) include a heat stabilizer, a UV absorber, a light stabilizer, a mold release agent, a lubricant, a sliding agent (e.g., PTFE particles), a colorant (a pigment such as carbon black or titanium oxide, or a dye), an optical diffuser (e.g., acrylic cross-linked particles, silicon cross-linked particles, ultra-thin glass flakes, calcium carbonate particles), a fluorescent whitening agent, a luminescent pigment, a fluorescent dye, an antistatic agent, a flow modifier, a crystal nucleating agent, an inorganic or organic antimicrobial agent, a photocatalytic antifouling agent (e.g., microparticulate titanium oxide, microparticulate zinc oxide), an impact modifier represented by grafted rubber, an infrared absorber, and/or a photochromic agent.

3. Second Embodiment (Example of Method of Producing Resin Composition)

[3-1. Method of Producing Resin Composition]

A method of producing a resin composition according to the second embodiment of the present technology is a production method including: at least adding at least one thermoplastic resin (A) and a hydroxyl fatty acid ester (B); kneading the at least one thermoplastic resin (A) and the hydroxyl fatty acid ester (B); and performing the kneading to produce at least one thermoplastic resin (C), in which when the weight-average molecular weight of the at least one thermoplastic resin (A) in terms of polystyrene is set to MW0 and the weight-average molecular weight of the at least one thermoplastic resin (C) in terms of polystyrene is set to MW1, the MW1 is decreased by 5% or more from the MW0. The at least one thermoplastic resin (A), the hydroxyl fatty acid ester (B), and the at least one thermoplastic resin (C) are as described in the section of the above first embodiment (example of the resin composition), and the detailed description is thus herein omitted. The resin composition produced by the method of producing a resin composition according to the second embodiment of the present technology is also as described in the above first embodiment (example of the resin composition), and the detailed description is thus herein omitted.

In the method of producing a resin composition according to the second embodiment of the present technology, 100 parts by mass of the at least one thermoplastic resin (A) and 0.01 to 10 parts by mass of the hydroxyl fatty acid ester (B) are preferably at least added.

The method of producing a resin composition according to the second embodiment of the present technology may include: at least adding at least one thermoplastic resin (A) and a hydroxyl fatty acid ester (B); and then mixing the at least one thermoplastic resin (A) and the hydroxyl fatty acid ester (B). In addition, the method of producing a resin composition according to the second embodiment of the present technology optionally includes dispersing the at least one thermoplastic resin (A) and the hydroxyl fatty acid ester (B) substantially uniformly using a Henschel mixer or a tumbler.

Examples of the kneading of the at least one thermoplastic resin (A) and the hydroxyl fatty acid ester (B) in the method of producing a resin composition according to the second embodiment of the present technology include melt kneading using a single-screw or twin-screw extruder after the dispersion. Then, a strand obtained at the time of the melt kneading may be cut into pellets by using a pelletizer for production. Note that a flame retardant resin composition produced by the method of producing a flame retardant resin composition according to the second embodiment of the present technology is not limited to a processed pellet shape, and may include those processed in a mixed state (powder state or liquid state) of the respective components or in a different from (e.g., a sheet shape, a ground state). In addition, in the method of producing a resin composition according to the second embodiment of the present technology, the kneading of the at least one thermoplastic resin (A) and the hydroxyl fatty acid ester (B) may be kneading performed multiple times or kneading performed once. The kneading may be performed once. In this case, the at least one thermoplastic resin (A) and the hydroxyl fatty acid ester (B) may be mixed uniformly to irreversibly produce at least one thermoplastic resin (C) while the molecular weight (desired flowability) is adjusted as desired. Then, the number of kneading operations may be one time. This process is defined such that various materials are blended at a given blending ratio and blended with a tumbler; a twin-screw coaxially rotating kneading extruder (LABO PLASTO-MILL, manufactured by Toyo Seiki Seisaku-sho, Ltd.; using a twin-screw extrusion unit) is then used; and melt kneading is performed to prepare a pellet. The kneading conditions, for instance, the extrusion conditions are at a discharge rate of 4 kg/h, a screw speed of 48 rpm as well as at an extrusion temperature of 270° C. from the first supply port to a die part.

In addition, the method of producing a flame retardant resin composition according to the second embodiment of the present technology optionally includes adding a component(s) (e.g., a shock resistance improver, an inorganic filler, a flame retardant, a dripping inhibitor) other than the at least one thermoplastic resin (A) and the hydroxyl fatty acid ester (B) as described above.

4. Third Embodiment (Example of Method of Producing Resin Molding)

[4-1. Method of Producing Resin Molding]

A method of producing a resin molding according to the third embodiment of the present technology is a resin molding production method including: causing a resin composition to produce a resin pellet; and adding a hydroxyl fatty acid ester (B) to the resin pellet before the resin pellet is molded, in which the resin composition is prepared by blending at least one thermoplastic resin (A) and the hydroxyl fatty acid ester (B) and when the weight-average molecular weight of the at least one thermoplastic resin (A) in terms of polystyrene is set to MW0 and the weight-average molecular weight of at least one thermoplastic resin (C) which has been produced after the blending in terms of polystyrene is set to MW1, the MW1 is decreased by 5% or more from the MW0. The at least one thermoplastic resin (A), the hydroxyl fatty acid ester (B), and the at least one thermoplastic resin (C) are as described in the section of the above first embodiment (example of the resin composition), and the detailed description is thus herein omitted. The resin composition used in the method of producing a resin molding according to the third embodiment of the present technology is also as described in the above first embodiment (example of the resin composition), and the detailed description is thus herein omitted. The method of producing a resin composition used in the method of producing a resin molding according to the third embodiment of the present technology is also as described in the above second embodiment (example of the method of producing a resin composition), and the detailed description is thus herein omitted.

Examples of how to mold a resin pellet in the method of producing a resin molding according to the third embodiment (example of the method of producing a resin molding) of the present technology include a molding procedure such as injection molding, injection compression molding, extrusion molding, blow molding, vacuum molding, press molding, foam molding, or supercritical molding. Then, such a molding procedure may be used to form a prescribed shape (e.g., housings and component materials for various products, such as home appliances, automobiles, information equipment, office equipment, telephones, stationery, furniture, or textiles). In this way, the resin molding can be obtained.

Modification examples of the method of producing a resin molding according to the third embodiment (example of the method of producing a resin molding) of the present technology include a method of producing a resin molding, the method including forming a resin composition into a resin pellet and adding a hydroxyl fatty acid ester (B) to the resin pellet before the resin pellet is molded. Note that the resin composition is not particularly limited and may be any resin composition.

Examples of how to mold a resin pellet in a modification example of the method of producing a resin molding according to the third embodiment of the present technology include a molding procedure such as injection molding, injection compression molding, extrusion molding, blow molding, vacuum molding, press molding, foam molding, or supercritical molding. Then, such a molding procedure may be used to form a prescribed shape (e.g., housings and component materials for various products, such as home appliances, automobiles, information equipment, office equipment, telephones, stationery, furniture, or textiles). In this way, the resin molding can be obtained.

[4-2. Resin Molding]

The resin molding is a resin molding obtained by using the resin composition according to the first embodiment of the present technology by the method of producing a resin molding according to the third embodiment (example of the method of producing a resin molding) of the present technology. This resin molding can be obtained by including the resin composition according to the first embodiment of the present technology, the resin composition having excellent flowability and further having excellent shock resistance, favorable flame retardancy, and superior rigidity, and this resin molding also has excellent shock resistance, favorable flame retardancy, superior rigidity, and marked processing and molding performance while keeping excellent flowability.

Meanwhile, the resin molding is a resin molding obtained by using the resin composition, which has been produced by the method of producing a resin composition according to the second embodiment of the present technology, in the method of producing a resin molding according to the third embodiment (example of the method of producing a resin molding) of the present technology. This resin molding can be obtained by including the resin composition, which has been produced by the method of producing a resin composition according to the second embodiment of the present technology, while having excellent flowability and having excellent shock resistance, favorable flame retardancy, and superior rigidity, and this resin molding also has excellent shock resistance, favorable flame retardancy, superior rigidity, and marked molding and processing performance while keeping excellent flowability.

Examples

Hereinbelow, the effects of the present technology will be described specifically by referring to Examples. Note that the scope of the present technology is not limited to the Examples.

Resin compositions according to Examples 1 to 26 and resin compositions according to Comparative Examples 1 to 15 were prepared and the resin compositions in the respective Examples and the resin compositions in the respective Comparative Examples were evaluated.

The following Tables 1 and 2 show the evaluation results of the configuration (the component ratio is represented in parts by mass) and the flowability (g/10 min) of the resin composition of each of Examples 1 to 26 and the evaluation results of the weight-average molecular weight (MW1) in terms of polystyrene and the rate of decrease in the weight-average molecular weight, and the tensile strength (Kgf/cm$^2$) of the thermoplastic resin (C), and the evaluation results of the impact strength (kgf·cm/cm$^2$) as well as the flame retardancy and the molding performance of the outer frame (bezel) of a 40-inch TV and so on.

The following Table 3 shows the evaluation results of the configuration (the component ratio is represented in parts by mass) and the flowability (g/10 min) of the resin composition of each of Comparative Examples 1 to 15 and the evaluation results of the weight-average molecular weight (MW1) in terms of polystyrene and the rate of decrease in the weight-average molecular weight, and the tensile strength (Kgf/cm$^2$) of the thermoplastic resin (C), and the evaluation results of the impact strength (kgf·cm/cm$^2$) as well as the flame retardancy and the molding performance of the outer frame (bezel) of a 40-inch TV and so on.

Hereinafter, Examples 1 to 26 and Comparative Examples 1 to 15 will be described in detail.

[Configurations of Resin Compositions According to Examples 1 to 26 and Resin Compositions According to Comparative Examples 1 to 15]

The respective components included in the resin compositions and resin moldings according to Examples 1 to 26 and in the resin compositions and resin moldings according to Comparative Examples 1 to 15 will be illustrated. Note that the respective components (component A, component B, component D, component E, and component F) correspond to the thermoplastic resin (A), the hydroxyl fatty acid ester (B), the flame retardant, the shock resistance improver, and the dripping inhibitor, respectively, as described in the above first embodiment.

(Component A: Thermoplastic Resin (A))

The following A-1-1 to A-1-4 components (each corresponding to the above-described polycarbonate resin (D)) and A-2-1 to A-2-2 components were each used as the thermoplastic resin (A), namely component A.

A-1-1: commercially available injection molding-use low-molecular-weight polycarbonate (PC) resin (L-1225L: a product from TEIJIN LIMITED; Mw: 44000 in terms of polystyrene (PS)).

A-1-2: polycarbonate (PC) resin prepared by crudely crushing used drinking water bottles and melt-kneading them using a twin-screw extruder to make a pellet (Mw: 51000 in terms of PS).

A-1-3: polycarbonate (PC) resin polystyrene (Mw: 32000 in terms of polystyrene (PS)) prepared by removing coating films (e.g., recording material layers, labels, adhesive layers, cured layers, metal reflection layers) from crushed, used CDs (2 to 20 mm) while treating them with an alkaline hot aqueous solution and by then melt-kneading them using a twin-screw extruder to make a pellet.

A-1-4: commercially available branched high-molecular-weight polycarbonate (PC) resin (7030PJ: a product from MITSUBISHI ELECTRIC ENGINEERING Co., Ltd.; Mw: 68500 in terms of polystyrene (PS)).

A-2-1: commercially available general-purpose ABS resin (500B: a product from TORAY INDUSTRIES, INC.).
A-2-2: commercially available general-purpose PET resin (MA-2103: a product from UNITIKA LTD.).

(Component B: Hydroxyl Fatty Acid Ester (B))

The following B-1 to B-4 components were each used as the hydroxyl fatty acid ester (B), namely component B.
B-1: commercially available polyglycerin fatty acid ester (CHIRABAZOL D-818M: a product from Taiyo Kagaku Co., Ltd.).
B-2: commercially available polyglycerin fatty acid ester (CHIRABAZOL H-818: a product from Taiyo Kagaku Co., Ltd.).
B-3: commercially available polyglycerin fatty acid ester (Poem TR-FB: a product from RIKEN VITAMIN CO., LTD.).
B-4: commercially available polyglycerin fatty acid ester (CHIRABAZOL H-40: a product from Taiyo Kagaku Co., Ltd.).

(Component F: Shock Resistance Improver)

The following F-1 to F-2 components were each used as the shock resistance improver, namely component F.
F-1: commercially available shock resistance improver (a polymer in which methyl methacrylate is grafted in silicone/acrylic composite rubber) ("METABLEN S2030", manufactured by MITSUBISHI RAYON CO., LTD.).
F-2: commercially available modified-type hydrogenated styrene-based thermoplastic elastomer (M-1943, manufactured by Asahi Kasei Chemicals Corporation).

(Component G: Inorganic Filler)

The following G-1 to G-2 components were each used as the inorganic filler, namely component F.
G-1: glass fibers: chopped strands (CSF-3PE-455, manufactured by Nitto Boseki Co., Ltd.).
G-2: microparticle-grade (median diameter: 5.0 μm; specific surface area: 40000 to 45000 cm$^2$/g) commercially available talc (FH-105, manufactured by FUJI TALC INDUSTRIAL CO., LTD.).

(Component H: Flame Retardant)

The following H-1 to H-3 components were each used as the flame retardant, namely component H.
H-1: organic sulfonic acid polymer metal salt obtained by introducing potassium sulfonate into a surface layer portion of polystyrene (PSS-K, manufactured by Sony Corporation).
H-2: methyl phenyl-based silicone oil (trade name: KR-480, manufactured by Shin-Etsu Chemical Co., Ltd.).
H-3: phosphate-based flame retardant (PX-200, manufactured by DAIHACHI CHEMICAL INDUSTRY CO., LTD.).

(Component I: Dripping Inhibitor)

The following I-1 component was used as the dripping inhibitor, namely component I.
I-1: commercially available PTFE, which is polytetrafluoroethylene with a fibril formation potential, (Polyflon FA500H, manufactured by DAIKIN INDUSTRIES, LTD.).

[To Prepare Resin Compositions and to Mold Resin Moldings According to Examples 1 to 26 and to Prepare Resin Compositions and to Mold Resin Moldings According to Comparative Examples 1 to 15]

The above-designated various components (A-1-1 to A-1-4 components, A-2-1 to A-2-2 components, B-1 to B-4 components, F-1 to F-2 components, G-1 to G-2 components, H-1 to H-3 components, and I-1 component) were blended at each blending ratio listed in Table 1 (Examples 1 to 26 and Comparative Examples 1 to 15), and blended with a tumbler. Next, a twin-screw coaxially rotating kneading extruder was used for melt kneading to prepare a pellet (a resin composition and a resin molding according to each of Examples or Comparative Examples). The resulting pellet was dried with a hot air-circulating dryer at 80 to 120° C. for 5 to 8 h. Then, an injection molding machine was used to mold a test piece for measurement of resin properties and a test piece for measurement of flame retardancy as well as an outer frame (bezel with a thickness of 1.5 mm) for a 40-inch TV or mold an outer frame (bezel with a thickness of 1.5 mm) for a 40-inch TV while component B was added.

Next, the above-prepared resin pellet, test piece for measurement of resin properties, and test piece for measurement of flame retardancy were used to evaluate the flowability (g/10 min), the tensile strength (Kgf/cm$^2$), the impact strength (kgf·cm/cm$^2$), and the flame retardancy in accordance with the following test protocols.

[Flowability (MFR: Melt Flow Rate) Measurement Protocol]

The flow characteristics of the resin compositions according to Examples 1 to 26 or the resin compositions according to Comparative Examples 1 to 15 when melted were measured under conditions at a resin temperature of 280° C. and at a load of 2.16 Kg in accordance with JIS K7210.

[Tensile Strength Test Protocol]

Each multi-purpose test piece type A1 t4.0 mm was used to measure the tensile strength in accordance with JIS K 7139.

[Impact Strength Test Protocol]

<Izod Impact Strength>

Each test piece of 80×10×t4.0 mm with a notch was used to measure the Izod impact strength in accordance with ISO 180.

[Flame Retardancy Test Protocol]

Each molded product (test piece for measurement of flame retardancy) as obtained above was used to conduct a vertical flame test of UL standard 94 while the thickness was 1.5 mm. Then, the grade was evaluated. V-0 or higher was judged as very good. The following Table 4 shows UL94 V specification and judgment standard. Note that a case where V was evaluated as unachieved (not passed) was judged as VNG (V was not good).

Tables 1 and 2 below show the results of Examples 1 to 26. In addition, Table 3 below shows the results of Comparative Examples 1 to 15.

As clear from Tables 1 to 3, the resin compositions according to Examples 1 to 26 have better molding and processing performance, represented by MFR, than the resin compositions according to Comparative Examples 1 to 15, and are considered to be able to freely adjust the flowability by selecting the kind and/or the additive amount.

In addition, in Examples 25 and 26, a prescribed amount of the hydroxyl fatty acid ester (B) was added at the same time when the resin pellet was injected into a molding machine, so that the molding performance was markedly enhanced.

Hereinafter, the results of Comparative Examples 1 to 15 are described in detail.

In a case where the number of functional groups of the additive agent or the additive amount for the resin compositions according to Comparative Examples 1 to 15 were not desired values, adjustment of the flowability was able to be found difficult.

In addition, Comparative Examples 1 and 7 differed from the previously mentioned Examples 25 and 26, and a prescribed amount of the hydroxyl fatty acid ester (B) was not added before molding. This caused a short-shot during molding and the molding and processing performance was thus able to be found poor.

TABLE 1

| | Raw material | | Example 1 | Example 2 | Example 3 | Example 4 | Example 5 |
|---|---|---|---|---|---|---|---|
| Resin composition | (Component A-1) PC resin | A-1-1 | 100 | 100 | 100 | 100 | 100 |
| | | A-1-2 | | | | | |
| | | A-1-3 | | | | | |
| | | A-1-4 | | | | | |
| | (Component A-2) Thermoplastic resin | A-2-1 | | | | | |
| | | A-2-2 | | | | | |
| | Molecular weight of component A (polycarbonate resin (D)) | in terms of polystyrene | 44000 | 44000 | 44000 | 44000 | 44000 |
| | (Component B) Hydroxyl fatty acid ester | B-1 | 0.1 | 0.3 | 0.5 | 1 | 10 |
| | | B-2 | | | | | |
| | | B-3 | | | | | |
| | | B-4 | | | | | |
| | (Component F) Shock resistance improver | F-1 | | | | | |
| | | F-2 | | | | | |
| | (Component G) Inorganic filler | G-1 | | | | | |
| | | G-2 | | | | | |
| | (Component H) Flame retardant | H-1 | | | | | |
| | | H-2 | | | | | |
| | | H-3 | | | | | |
| | (Component I) Dripping inhibitor | I-1 | | | | | |
| Criteria | Flowability (MFR) | [g/10 min] | 32.0 | 39.6 | 48.6 | 68.1 | 75.2 |
| | Molecular weight of component C (polycarbonate resin (E)) | in terms of polystyrene | 38200 | 37500 | 36600 | 35300 | 29000 |
| | | Rate of decrease [%] | 13.2 | 14.8 | 16.8 | 19.8 | 34.1 |
| | Tensile strength | [Kgf/cm2] | 615 | 602 | 594 | 591 | 588 |
| | Impact strength | [Kgf · cm/cm2] | 11.3 | 11.1 | 10.9 | 10.1 | 9.5 |
| | Flame retardancy (t1.5 mm) | 1.5 mmt | V-2 | V-2 | V-2 | V-2 | V-2 |
| | Molding performance of outer frame (bezel: 40") for TV | Releasing | ○ | ○ | ○ | ○ | ○ |
| | Strength of molding: outer frame (bezel: 40") for TV | 90-degree bending | ○ | ○ | ○ | ○ | ○ |
| | Appearance of molding: outer frame (bezel: 40") for TV | Visual inspection | ○ | ○ | ○ | ○ | ○ |

| | Raw material | | Example 6 | Example 7 | Example 8 | Example 9 |
|---|---|---|---|---|---|---|
| Resin composition | (Component A-1) PC resin | A-1-1 | 100 | | | |
| | | A-1-2 | | 100 | 20 | 100 |
| | | A-1-3 | | | 80 | |
| | | A-1-4 | | | | |
| | (Component A-2) Thermoplastic resin | A-2-1 | | | | |
| | | A-2-2 | | | | |
| | Molecular weight of component A (polycarbonate resin (D)) | in terms of polystyrene | 44000 | 51000 | 36400 | 51000 |
| | (Component B) Hydroxyl fatty acid ester | B-1 | | | 1.2 | 0.3 | 1.2 |
| | | B-2 | 0.5 | | | |
| | | B-3 | | | | |
| | | B-4 | | | | |
| | (Component F) Shock resistance improver | F-1 | | | | 1 |
| | | F-2 | | | | |
| | (Component G) Inorganic filler | G-1 | | | | |
| | | G-2 | | | | |
| | (Component H) Flame retardant | H-1 | | | | |
| | | H-2 | | | | |
| | | H-3 | | | | |
| | (Component I) Dripping inhibitor | I-1 | | | | |
| Criteria | Flowability (MFR) | [g/10 min] | 47.6 | 41.2 | 51.0 | 30.3 |
| | Molecular weight of component C (polycarbonate resin (E)) | in terms of polystyrene | 36700 | 37000 | 31800 | 38500 |
| | | Rate of decrease [%] | 16.6 | 27.5 | 12.6 | 24.5 |
| | Tensile strength | [Kgf/cm2] | 596 | 662 | 671 | 655 |
| | Impact strength | [Kgf · cm/cm2] | 10.5 | 7.4 | 7.8 | 11.2 |
| | Flame retardancy (t1.5 mm) | 1.5 mmt | V-2 | V-2 | V-2 | V-2 |
| | Molding performance of outer frame (bezel: 40") for TV | Releasing | ○ | ○ | ○ | ○ |
| | Strength of molding: outer frame (bezel: 40") for TV | 90-degree bending | ○ | ○ | ○ | ○ |

TABLE 1-continued

| | | | | | | |
|---|---|---|---|---|---|---|
| Appearance of molding: outer frame (bezel: 40") for TV | Visual inspection | | ○ | ○ | ○ | ○ |

| | | Raw material | Example 10 | Example 11 | Example 12 | Example 13 |
|---|---|---|---|---|---|---|
| Resin composition | (Component A-1) PC resin | A-1-1 | | | | 100 |
| | | A-1-2 | 100 | 100 | | |
| | | A-1-3 | | | 100 | |
| | | A-1-4 | | | | |
| | (Component A-2) Thermoplastic resin | A-2-1 | | | | |
| | | A-2-2 | | | | |
| | Molecular weight of component A (polycarbonate resin (D)) | in terms of polystyrene | 51000 | 51000 | 32000 | 44000 |
| | (Component B) Hydroxyl fatty acid ester | B-1 | 1.2 | 1.2 | 0.1 | 0.5 |
| | | B-2 | | | | |
| | | B-3 | | | | |
| | | B-4 | | | | |
| | (Component F) Shock resistance improver | F-1 | 3 | 10 | | |
| | | F-2 | | | | |
| | (Component G) Inorganic filler | G-1 | | | | 10 |
| | | G-2 | | | | |
| | (Component H) Flame retardant | H-1 | | | | |
| | | H-2 | | | | |
| | | H-3 | | | | |
| | (Component I) Dripping inhibitor | I-1 | | | | |
| Criteria | Flowability (MFR) | [g/10 min] | 29.8 | 28.5 | 62 | 24 |
| | Molecular weight of component C (polycarbonate resin (E)) | in terms of polystyrene | 38800 | 39500 | 29800 | 37600 |
| | | Rate of decrease [%] | 23.9 | 22.5 | 6.9 | 14.5 |
| | Tensile strength | [Kgf/cm2] | 655 | 671 | 639 | 715 |
| | Impact strength | [Kgf · cm/cm2] | 40.5 | 40.1 | 42.8 | 8.5 |
| | Flame retardancy (t1.5 mm) | 1.5 mmt | V-2 | V-2 | V-1 | V-2 |
| | Molding performance of outer frame (bezel: 40") for TV | Releasing | ○ | ○ | — | — |
| | Strength of molding: outer frame (bezel: 40") for TV | 90-degree bending | ○ | ○ | — | — |
| | Appearance of molding: outer frame (bezel: 40") for TV | Visual inspection | ○ | ○ | — | — |

TABLE 2

| | Raw material | | Example 14 | Example 15 | Example 16 | Example 17 | Example 18 | Example 19 | Example 20 | Example 21 | Example 22 | Example 23 | Example 24 | Example 25 | Example 26 |
|---|---|---|---|---|---|---|---|---|---|---|---|---|---|---|---|
| Resin composition | (Component A-1) PC resin | A-1-1 | 100 | 100 | 100 | 100 | | 100 | 100 | | | 90 | 90 | 100 (resin of Comparative Example 1) | 100 (resin of Comparative Example 9) |
| | | A-1-2 | | | | | | | | 33.5 | 50 | | | | |
| | | A-1-3 | | | | | | | | 66.5 | 50 | | | | |
| | | A-1-4 | | | | | 20 | | | | | | | | |
| | (Component A-2) Thermoplastic resin | A-2-1 | | | | | 80 | | | | | 10 | | | |
| | | A-2-2 | | | | | | | | | | | 10 | | |
| | Molecular weight of component A in terms of polystyrene | | 44000 | 44000 | 44000 | 44000 | 59600 | 44000 | 44000 | 42000 | 43700 | 43800 | 43900 | 43800 | 43900 |
| | (Component B) Hydroxyl fatty acid ester | B-1 | | 0.5 | 0.5 | 0.5 | | | 0.1 | 0.5 | 0.5 | 0.5 | 0.5 | | |
| | | B-2 | 0.5 | | | | | | | | | | | | |
| | | B-3 | | | | | 1.5 | | | | | | | 0.5 | |
| | | B-4 | | | | | | 0.1 | | | | | | | 0.5 |
| | (Component F) Shock resistance improver | F-1 | | 3 | 3 | | | | | | | | | | |
| | | F-2 | | | | 10 | | | 1 | | | | | | |
| | (Component G) Inorganic filler | G-1 | | 3 | 60 | | | | | 40 | 6 | | | | |
| | | G-2 | 6 | | | | | | | | 1 | | | | |
| | (Component H) Flame retardant | H-1 | | | | 0.3 | 0.1 | 0.3 | 0.3 | 0.1 | 0.3 | | | | |
| | | H-2 | | | | | 0.1 | | | | | | | | |
| | | H-3 | | | | | | | | 14 | | | | | |
| | (Component I) Dripping inhibitor | I-1 | | | | 0.3 | | 0.3 | 0.3 | 0.4 | 0.5 | | | | |
| Criteria | Flowability (MFR) | [g/10 min | 45.8 | 43.9 | 65.3 | 24.5 | 15.8 | 30.1 | 29.7 | 26.2 | 23.8 | 40.5 | 49.9 | | |
| | Molecular weight of component C (polycarbonate resin (E)) in terms of polystyrene | | 36300 | 36200 | 35700 | 38800 | 43200 | 38300 | 38200 | 36800 | 39500 | 37200 | 36500 | | |
| | Rate of decrease [%] | | 17.5 | 17.7 | 18.9 | 11.8 | 27.5 | 13.0 | 13.2 | 12.4 | 9.6 | 15.1 | 16.9 | | |
| | Tensile strength | [Kgf/cm2] | 631 | 622 | 632 | 717 | 595 | 616 | 61 | 1095 | 658 | 572 | 602 | | |
| | Impact strength | [Kgf · cm/cm2] | 7.1 | 12.1 | 6.5 | 8.4 | 12.1 | 11.5 | 35. | 5.9 | 7.3 | 23.3 | 6.1 | | |
| | Flame retardancy (t1.5 mm) | 1.5 mml | V-2 | V-2 | V-2 | V-0 | V-0 | V-0 | V-0 | V-0 | V-0 | | | | |
| | Molding performance of outer frame (bezel: 40") for TV | Releasing | — | — | — | — | — | ○ | ○ | — | — | — | — | — | — |
| | Strength of molding: outer frame (bezel: 40") for TV | 90-degree bending | — | — | — | — | — | ○ | ○ | — | — | ○ | ○ | ○ | △ |
| | Appearance of molding: outer frame (bezel: 40") for TV | Visual inspection | — | — | — | — | — | ○ | ○ | — | — | ○ | ○ | ○ | ○ |
| | | | — | — | — | — | — | ○ | ○ | — | — | ○ | ○ | ○ | ○ |

TABLE 3

| Resin composition | Raw material | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|---|---|---|---|---|---|---|---|---|
| | (Component A-1) PC resin | A-1-1 | 100 | 100 | 20 | | 100 | 100 | 100 | 100 | | 100 | 100 | | | | |
| | | A-1-2 | | | 80 | | | | | | | | | 33.5 | 50 | 90 | 90 |
| | | A-1-3 | | | | | | | | | | | | 66.5 | 50 | | |
| | | A-1-4 | | | | 100 | | | | | | | | | | | |
| | (Component A-2) Thermoplastic resin | A-2-1 | | | | | | | | | 20 | | | | | 10 | |
| | | A-2-2 | | | | | | | | | 80 | | | | | | 10 |
| | Molecular weight of component A in terms of polystyrene | | 44000 | 51000 | 36400 | 68500 | 44000 | 44000 | 44000 | 44000 | 59600 | 44000 | 44000 | 42000 | 43700 | 43800 | 43900 |
| | (Component B) (polycarbonate resin D) | B-1 | | | | | 0.5 | | | | | | | | | | |
| | | B-2 | | | | | | 0.5 | | | | | | | | | |
| | | B-3 | | | | | | | | | | | | | | | |
| | | B-4 | | | | | | | | | | | | | | | |
| | (Component F) Hydroxyl fatty acid ester | F-1 | | | | | | | | | | | | | | | |
| | | F-2 | | | | | | | | | | | | | | | |
| | Shock resistance improver | | | | | | | | 10 | | | | 1 | | | | |
| | (Component G) Inorganic filler | G-1 | | | | | | | | | | | | | 6 | | |
| | | G-2 | | | | | | | | 8 | | | | 40 | | | |
| | (Component H) Flame retardant | H-1 | | | | | | | | | 0.1 | 0.3 | 0.3 | 0.1 | 1 | | |
| | | H-2 | | | | | | | | | 0.1 | | | | 0.3 | | |
| | | H-3 | | | | | | | | | | | | 14.5 | | | |
| | (Component I) Dripping inhibitor | I-1 | | | | | | | | | | 0.3 | 0.3 | 0.4 | 0.5 | | |
| Criteria | Flowability (MFR) [g/110 min] | | 19.4 | 3.4 | 40 | 3.1 | 20.1 | 19.8 | 12 | 23 | 4 | 18.5 | 17.5 | 15.1 | 15 | 18 | 26 |
| | Molecular weight of polycarbonate resin (E) in terms of polystyrene | | 44000 | 51000 | 36400 | 68500 | 43200 | 43300 | 43600 | 43400 | 59600 | 43700 | 43600 | 42000 | 43700 | 43800 | 43900 |
| | Rate of decrease [%] | | — | — | — | — | 1.8 | 1.6 | — | — | — | — | — | — | — | — | — |
| | Tensile strength [Kgf/cm²] | | 625 | 662 | 673 | 643 | 626 | 630 | 723 | 631 | 595 | 616 | 609 | 1100 | 667 | 580 | 607 |
| | Impact strength [Kgf·cm/cm²] | | 12.1 | 7.4 | 8.1 | 43.1 | 12.2 | 12.3 | 8.5 | 7.4 | 12.6 | 11.5 | 34.8 | 15.1 | 7.5 | 25.4 | 6.5 |
| | Flame retardancy (t1.5 mm) 1.5 mm | | V-2 | V-2 | V-2 | V-1 | V-2 | V-2 | V-2 | V-2 | V-1 | V-1 | V-1 | — | V-1 | — | — |
| | Molding performance of outer frame (bezel: 40°) for TV Releasing | | X: Short | X: Short | ○ | X: Short | X: Short | X: Short | — | — | X: Short | ○ | ○ | — | — | — | — |
| | Strength of molding: outer frame (bezel: 40°) for TV bending 90-degree | | — | — | X: Occurrence of a fracture | — | — | — | — | — | — | ○ | ○ | — | — | — | — |
| | Appearance of molding: outer frame (bezel: 40°) for TV inspection Visual | | — | — | ○ | — | — | — | — | — | — | ○ | ○ | — | — | — | — |

TABLE 4

UL94 V specification and judgment standard

| | | Classification | | |
|---|---|---|---|---|
| | | V-0 | V-1 | V-2 |
| Judgment Standard | Burning time (S) after first flame ignition | ≤10 | ≤30 | ≤30 |
| | Burning time (S) after second flame ignition | ≤10 | ≤30 | ≤30 |
| | Total burning time of five pieces | ≤50 | ≤250 | ≤250 |
| | Burning time + Glowing time (S) for each test piece | ≤30 | ≤60 | ≤60 |
| | Did burning reach clamp? | No | No | No |
| | Was Fabric fired by dropped material? | No | No | Yes |

The present technology is not limited to only the above respective Embodiments or respective Examples, and may be modified without departing from the spirit of the present technology.

Note that the effects described in the present disclosure are just examples and do not have any limitation. Hence, the present technology not only exerts the effects disclosed herein, but may also exert the effects not disclosed herein.

In addition, the present technology can take the following configurations.

[1]

A resin composition including:
at least one thermoplastic resin (A); and a hydroxyl fatty acid ester (B) that are at least blended, in which
when a weight-average molecular weight of the at least one thermoplastic resin (A) in terms of polystyrene is set to MW0 and
a weight-average molecular weight of at least one thermoplastic resin (C) which has been produced after the blending in terms of polystyrene is set to MW1,
the MW1 is decreased by 5% or more from the MW0.

[2]

The resin composition according to [1], in which content of the hydroxyl fatty acid ester (B) with respect to 100 parts by mass of the at least one thermoplastic resin (A) is from 0.01 to 10 parts by mass.

[3]

The resin composition according to [1] or [2], in which the at least one thermoplastic resin (A) at least includes a polycarbonate resin (D).

[4]

The resin composition according to [3], in which the polycarbonate resin (D) includes a recovered polycarbonate resin.

[5]

The resin composition according to [3] or [4], in which the polycarbonate resin (D) is an aromatic polycarbonate resin.

[6]

The resin composition according to any one of [3] to [5], in which the polycarbonate resin (D) includes a branch structure-containing aromatic polycarbonate resin.

[7]

The resin composition according to any one of [3] to [6], in which the polycarbonate resin (D) includes an aromatic polycarbonate-polyorganosiloxane copolymer.

[8]

The resin composition according to any one of [3] to [7], in which the polycarbonate resin (D) includes a polycarbonate resin having a weight-average molecular weight of from 30,000 to 70,000 in terms of polystyrene.

[9]

The resin composition according to [1] or [2], in which the at least one thermoplastic resin (A) is a polycarbonate resin (D).

[10]

The resin composition according to [9], in which the polycarbonate resin (D) is a recovered polycarbonate resin.

[11]

The resin composition according to [9], in which the polycarbonate resin (D) includes an aromatic polycarbonate resin, and
content of the aromatic polycarbonate resin is from 1 to 100 mass % with respect to a total mass of the polycarbonate resin (D).

[12]

The resin composition according to [9], in which the polycarbonate resin (D) is a branch structure-containing aromatic polycarbonate resin.

[13]

The resin composition according to [9], in which the polycarbonate resin (D) includes an aromatic polycarbonate-polyorganosiloxane copolymer.

[14]

The resin composition according to any one of [9] to [13], in which the polycarbonate resin (D) is a polycarbonate resin having a weight-average molecular weight of from 30,000 to 70,000 in terms of polystyrene.

[15]

The resin composition according to any one of [1] to [14], in which the at least one thermoplastic resin (C) at least includes a polycarbonate resin (E).

[16]

The resin composition according to [15], in which the polycarbonate resin (E) includes a polycarbonate resin having a weight-average molecular weight of from 20,000 to 65,000 in terms of polystyrene.

[17]

The resin composition according to any one of [1] to [14], in which the at least one thermoplastic resin (C) is a polycarbonate resin (E).

[18]

The resin composition according to [17], in which the polycarbonate resin (E) is a polycarbonate resin having a weight-average molecular weight of from 20,000 to 65,000 in terms of polystyrene.

[19]

The resin composition according to any one of [1] to [18], in which the hydroxyl fatty acid ester (B) includes a glycerin fatty acid ester and/or a polyglycerin fatty acid ester.

[20]

The resin composition according to any one of [1] to [19], in which the hydroxyl fatty acid ester (B) has a hydroxyl value of 50 or higher.

[21]

The resin composition according to any one of [1] to [20], in which the hydroxyl fatty acid ester (B) has an acid value of less than 5.

[22]

The resin composition according to any one of [1] to [21], in which the hydroxyl fatty acid ester (B) has a saponification value of from 150 to 300.

[23]
The resin composition according to any one of [1] to [22], further including
a shock resistance improver, in which
content of the shock resistance improver with respect to 100 parts by mass of the at least one thermoplastic resin (A) is from 0.1 to 10 parts by mass.

[24]
The resin composition according to any one of [1] to [23], further including
an inorganic filler, in which
content of the inorganic filler with respect to 100 parts by mass of the at least one thermoplastic resin (A) is from 3 to 60.

[25]
The resin composition according to any one of [1] to [24], further including
a flame retardant, in which
content of the flame retardant with respect to 100 parts by mass of the at least one thermoplastic resin (A) is from 0.01 to 200 parts by mass.

[26]
The resin composition according to [25], in which the flame retardant is at least one organic flame retardant from a phosphate-based flame retardant, a siloxane-based compound, or an organic metal salt-based flame retardant.

[27]
The resin composition according to [25], in which the flame retardant includes an organic sulfonic acid metal salt compound.

[28]
The resin composition according to [26], in which the organic metal salt-based flame retardant includes an organic sulfonic acid polymer and/or a metal salt compound of the organic sulfonic acid polymer.

[29]
The resin composition according to [28], in which the organic sulfonic acid polymer and/or the metal salt compound of the organic sulfonic acid polymer have a weight-average molecular weight of 20,000 or higher in terms of polystyrene.

[30]
The resin composition according to [28] or [29], in which the organic sulfonic acid polymer and/or the metal salt compound of the organic sulfonic acid polymer includes 1 mol % to 100 mol % of an aromatic ring and the aromatic ring has 0.01 to 10 mol % of a sulfonate group and/or a metal sulfonate group introduced.

[31]
A method of producing a resin composition, the method including:
at least adding at least one thermoplastic resin (A) and a hydroxyl fatty acid ester (B);
kneading the at least one thermoplastic resin (A) and the hydroxyl fatty acid ester (B); and
performing the kneading to produce the at least one thermoplastic resin (C), in which
when a weight-average molecular weight of the at least one thermoplastic resin (A) in terms of polystyrene is set to MW0 and
a weight-average molecular weight of the at least one thermoplastic resin (C) in terms of polystyrene is set to MW1,
the MW1 is decreased by 5% or more from the MW0.

[32]
The method of producing a resin composition according to [31], in which 100 parts by mass of the at least one thermoplastic resin (A) and 0.01 to 10 parts by mass of the hydroxyl fatty acid ester (B) are at least added.

[33]
The method of producing a resin composition according to [31] or [32], in which the kneading is performed at least once.

[34]
The method of producing a resin composition according to any one of [31] to [33], in which the at least one thermoplastic resin (A) at least includes a polycarbonate resin (D).

[35]
The method of producing a resin composition according to [34], in which the polycarbonate resin (D) includes a recovered polycarbonate resin.

[36]
The method of producing a resin composition according to [34] or [35], in which the polycarbonate resin (D) is an aromatic polycarbonate resin.

[37]
The method of producing a resin composition according to any one of [34] to [36], in which the polycarbonate resin (D) includes a branch structure-containing aromatic polycarbonate resin.

[38]
The method of producing a resin composition according to any one of [34] to [37], in which the polycarbonate resin (D) includes an aromatic polycarbonate-polyorganosiloxane copolymer.

[39]
The method of producing a resin composition according to any one of [34] to [38], in which the polycarbonate resin (D) includes a polycarbonate resin having a weight-average molecular weight of from 30,000 to 70,000 in terms of polystyrene.

[40]
The method of producing a resin composition according to any one of [31] to [33], in which the at least one thermoplastic resin (A) includes a polycarbonate resin (D).

[41]
The method of producing a resin composition according to [40], in which the polycarbonate resin (D) is a recovered polycarbonate resin.

[42]
The method of producing a resin composition according to [40], in which
the polycarbonate resin (D) includes an aromatic polycarbonate resin, and
content of the aromatic polycarbonate resin is from 1 to 100 mass' with respect to a total mass of the polycarbonate resin (D).

[43]
The method of producing a resin composition according to [40], in which the polycarbonate resin (D) is a branch structure-containing aromatic polycarbonate resin.

[44]
The method of producing a resin composition according to [38], in which the polycarbonate resin (D) includes an aromatic polycarbonate-polyorganosiloxane copolymer.

[45]
The method of producing a resin composition according to any one of [40] to [44], in which the polycarbonate resin (D) is a polycarbonate resin having a weight-average molecular weight of from 30,000 to 70,000 in terms of polystyrene.

[46]
The method of producing a resin composition according to any one of [31] to [45], in which the at least one thermoplastic resin (C) at least includes a polycarbonate resin (E).

[47]
The method of producing a resin composition according to [46], in which the polycarbonate resin (E) includes a polycarbonate resin having a weight-average molecular weight of from 20,000 to 65,000 in terms of polystyrene.

[48]
The method of producing a resin composition according to any one of [31] to [45], in which the at least one thermoplastic resin (C) is a polycarbonate resin (E).

[49]
The method of producing a resin composition according to [48], in which the polycarbonate resin (E) is a polycarbonate resin having a weight-average molecular weight of from 20,000 to 65,000 in terms of polystyrene.

[50]
The method of producing a resin composition according to any one of [31] to [49], in which the hydroxyl fatty acid ester (B) includes a glycerin fatty acid ester and/or a polyglycerin fatty acid ester.

[51]
The method of producing a resin composition according to any one of [31] to [50], in which the hydroxyl fatty acid ester (B) has a hydroxyl value of 50 or higher.

[52]
The method of producing a resin composition according to any one of [31] to [51], in which the hydroxyl fatty acid ester (B) has an acid value of less than 5.

[53]
The method of producing a resin composition according to any one of [31] to [52], in which the hydroxyl fatty acid ester (B) has a saponification value of from 150 to 300.

[54]
The method of producing a resin composition according to any one of [31] to [53], in which
the resin composition includes a shock resistance improver, and
content of the shock resistance improver with respect to 100 parts by mass of the at least one thermoplastic resin (A) is from 0.1 to 10 parts by mass.

[55]
The method of producing a resin composition according to any one of [31] to [54], in which
the resin composition includes an inorganic filler, and
content of the inorganic filler with respect to 100 parts by mass of the at least one thermoplastic resin (A) is from 3 to 60.

[56]
The method of producing a resin composition according to any one of [31] to [55], in which
the resin composition includes a flame retardant, and
content of the flame retardant with respect to 100 parts by mass of the at least one thermoplastic resin (A) is from 0.01 to 200 parts by mass.

[57]
The method of producing a resin composition according to [56], in which the flame retardant is at least one organic flame retardant from a phosphate-based flame retardant, a siloxane-based compound, or an organic metal salt-based flame retardant.

[58]
The method of producing a resin composition according to [56], in which the flame retardant includes an organic sulfonic acid metal salt.

[59]
The method of producing a resin composition according to [57], in which the organic metal salt-based flame retardant includes an organic sulfonic acid polymer and/or a metal salt compound of the organic sulfonic acid polymer.

[60]
The method of producing a resin composition according to [59], in which the organic sulfonic acid polymer and/or the metal salt compound of the organic sulfonic acid polymer have a weight-average molecular weight of 20,000 or higher in terms of polystyrene.

[61]
The method of producing a resin composition according to [59] or [60], in which the organic sulfonic acid polymer and/or the metal salt compound of the organic sulfonic acid polymer includes 1 mol % to 100 mol % of an aromatic ring and the aromatic ring has 0.01 to 10 mol % of a sulfonate group and/or a metal sulfonate group introduced.

[62]
A method of producing a resin molding, the method including:
forming a resin composition into a resin pellet; and
adding a hydroxyl fatty acid ester (B) to the resin pellet before the resin pellet is subjected to injection molding,
in which
the resin composition is prepared by blending at least one thermoplastic resin (A) and the hydroxyl fatty acid ester (B), and
when a weight-average molecular weight of the at least one thermoplastic resin (A) in terms of polystyrene is set to MW0 and
a weight-average molecular weight of at least one thermoplastic resin (C) which has been produced after the blending in terms of polystyrene is set to MW1,
the MW1 is decreased by 5% or more from the MW0.

[63]
A method of producing a resin molding, including
forming a resin composition into a resin pellet and
adding a hydroxyl fatty acid ester (B) to the resin pellet before the resin pellet is subjected to injection molding.

The invention claimed is:
1. A thermoplastic resin composition consisting of:
a thermoplastic resin (A) and a hydroxyl fatty acid ester (B),
wherein the thermoplastic resin (A) consists of a polycarbonate resin (D), the polycarbonate resin (D) is a low molecular weight polycarbonate resin having a weight-average molecular weight of 44,000 in terms of polystyrene,
wherein when a weight-average molecular weight of the polycarbonate resin (D) in terms of polystyrene is set to MW0 and
a weight-average molecular weight of a polycarbonate resin (E) which has been produced after the blending in terms of polystyrene is set to MW1, the weight-average molecular weight after the blending of the polycarbonate resin (E) is from 29,000 to 35,300 in terms of polystyrene,
the MW1 is decreased by 5% or more from the MW0,
wherein a content of the hydroxyl fatty acid ester (B) with respect to 100 parts by mass of the polycarbonate resin (D) is from 1.0 to 10 parts by mass, and
wherein the thermoplastic resin composition does not include ABS, and wherein a melt flow rate of the polycarbonate resin (E) ranges from 68.1 g/10 min to 75.2 g/10 min.

2. The thermoplastic resin composition according to claim 1, wherein the polycarbonate resin (D) is a recovered polycarbonate resin.

3. The thermoplastic resin composition according to claim 1, wherein the hydroxyl fatty acid ester (B) includes a glycerin fatty acid ester or a polyglycerin fatty acid ester.

4. The thermoplastic resin composition according to claim 1, wherein the hydroxyl fatty acid ester (B) has a hydroxyl value of 50 or higher.

5. The thermoplastic resin composition according to claim 1, wherein the hydroxyl fatty acid ester (B) has an acid value of less than 5.

6. The thermoplastic resin composition according to claim 1, wherein the hydroxyl fatty acid ester (B) has a saponification value of from 150 to 300.

* * * * *